(12) United States Patent
Gojkovic et al.

(10) Patent No.: US 12,021,948 B2
(45) Date of Patent: Jun. 25, 2024

(54) LOYALTY SWITCH

(71) Applicant: Switch Technology Solutions LLC, Binghamton, NY (US)

(72) Inventors: Mirko Gojkovic, Toronto (CA); Raymond H. Stanton, III, Binghamton, NY (US); Luke Stanton, Binghamton, NY (US); Vikas Mehta, Glen Ellyn, IL (US)

(73) Assignee: Switch Technology Solutions LLC, Binghamton, NY (US)

( * ) Notice: Subject to any disclaimer, the term of this patent is extended or adjusted under 35 U.S.C. 154(b) by 128 days.

(21) Appl. No.: 16/889,994

(22) Filed: Jun. 2, 2020

(65) Prior Publication Data

US 2020/0322452 A1    Oct. 8, 2020

Related U.S. Application Data

(63) Continuation of application No. 16/389,056, filed on Apr. 19, 2019, now Pat. No. 10,715,636.

(60) Provisional application No. 62/660,496, filed on Apr. 20, 2018.

(51) Int. Cl.
| | |
|---|---|
| H04L 67/63 | (2022.01) |
| G06Q 20/02 | (2012.01) |
| H04L 41/0686 | (2022.01) |
| H04L 47/74 | (2022.01) |
| H04L 47/80 | (2022.01) |
| H04L 51/214 | (2022.01) |
| H04L 51/226 | (2022.01) |

(52) U.S. Cl.
CPC ............ H04L 67/63 (2022.05); G06Q 20/027 (2013.01); H04L 41/0686 (2013.01); H04L 47/746 (2013.01); H04L 47/808 (2013.01); H04L 51/214 (2022.05); H04L 51/226 (2022.05)

(58) Field of Classification Search
CPC .................................................... H04L 67/327
See application file for complete search history.

(56) References Cited

U.S. PATENT DOCUMENTS

| | | | | |
|---|---|---|---|---|
| 7,620,567 | B2 * | 11/2009 | George | ............. G06Q 30/0226 |
| | | | | 705/64 |
| 7,905,400 | B2 * | 3/2011 | Stoutenburg | .......... G07F 7/1008 |
| | | | | 235/383 |
| 9,479,457 | B2 * | 10/2016 | Sindhu | ................ H04L 47/6215 |
| 10,715,636 | B2 * | 7/2020 | Gojkovic | .............. H04L 47/808 |
| 2003/0182464 | A1 * | 9/2003 | Hamilton | ................ G06F 9/546 |
| | | | | 719/314 |
| 2004/0210498 | A1 | 10/2004 | Freund | |
| 2006/0208064 | A1 * | 9/2006 | Mendelovich | ....... G06Q 20/227 |
| | | | | 705/14.4 |

(Continued)

Primary Examiner — Nicholas P Celani
(74) Attorney, Agent, or Firm — Maier & Maier, PLLC

(57) ABSTRACT

A loyalty switch for examining loyalty messages and routing the loyalty messages to one or more loyalty hosts and examining responses and routing the responses back to stores. Such a switch has configurable number of selector handlers pool, and the switch accepts a connection from stores and reads loyalty host information from master data to establish the connection with a loyalty host and to route messages. Each selector handler in the switch has multiple store objects that contain a routing map and connection information from companies' sites and the loyalty host.

8 Claims, 26 Drawing Sheets

(56) References Cited

U.S. PATENT DOCUMENTS

| | | | |
|---|---|---|---|
| 2008/0320151 A1* | 12/2008 | McCanne | H04L 67/01 |
| | | | 709/228 |
| 2011/0106695 A1* | 5/2011 | Fernandez | G06Q 20/204 |
| | | | 705/39 |
| 2013/0238408 A1* | 9/2013 | Cooke | G06Q 30/0207 |
| | | | 705/14.27 |
| 2014/0344154 A1* | 11/2014 | Flurscheim | G06Q 20/10 |
| | | | 705/44 |
| 2015/0032635 A1* | 1/2015 | Guise | G06Q 20/40145 |
| | | | 705/72 |
| 2022/0150300 A1* | 5/2022 | Gojkovic | H04L 67/1001 |

* cited by examiner

Permission Configuration for users

Fig. 21

LOYALTY SWITCH

CROSS-REFERENCE TO RELATED APPLICATIONS

This application claims priority to U.S. application Ser. No. 16/389,056, filed Apr. 19, 2019, and U.S. Provisional Application No. 62/660,496, filed Apr. 20, 2018, which is incorporated by reference in its entirety.

BACKGROUND

Gas stations provide rewards to their customers by using their partnerships with other companies, such as convenience stores, credit card companies, etc. For such a partnership program, the gas station and their partnership companies generally communicate information about customer loyalty transactions via the internet network by using Extensible Markup Language (XML). However, the current configuration at the companies' sites allows for only one national loyalty host. Store level configurations can allow the companies to control what is considered a loyalty transaction and what is triggering a loyalty ID for the company and the company's partnership programs, i.e. specific bin range, loyalty ID, 10 digit phone number, etc. However, the reality is that there is no control or ability to route the transactions to different loyalty hosts.

SUMMARY

A loyalty switch for examining loyalty messages, routing the loyalty messages to one or more loyalty hosts, examining responses, and routing the responses back to stores, is disclosed. Such a switch has a configurable number of selector handlers (a handler pool), and the switch accepts a connection from stores and reads loyalty host information from master data to establish the connection with a loyalty host and to route messages. Each selector handler in the switch has multiple store objects that contain a routing map and connection information from the companies' sites and the loyalty host.

According to various exemplary embodiments, the present invention provides a computer implemented method for connecting a client computing resource with at least one loyalty host computing resource.

According to other exemplary embodiments, the present invention includes one or more tangible non-transitory computer-readable storage media embodying computer-readable instructions that are executable by an identity computing resource to carry out a computer implemented method for connecting a client computing resource with at least one loyalty host computing resource.

According to various exemplary embodiments, the present invention includes a loyalty switch computing resource for routing a transaction message between one or more client computing resources and at least one loyalty host computing resource.

BRIEF DESCRIPTION OF THE FIGURES

Advantages of embodiments of the present invention will be apparent from the following detailed description of the exemplary embodiments. The description should be considered in conjunction with the accompanying drawings in which like numerals indicate like elements.

FIG. 21 shows the loyalty switch system's GUI according to an exemplary embodiment;

DETAILED DESCRIPTION

Figure 1:
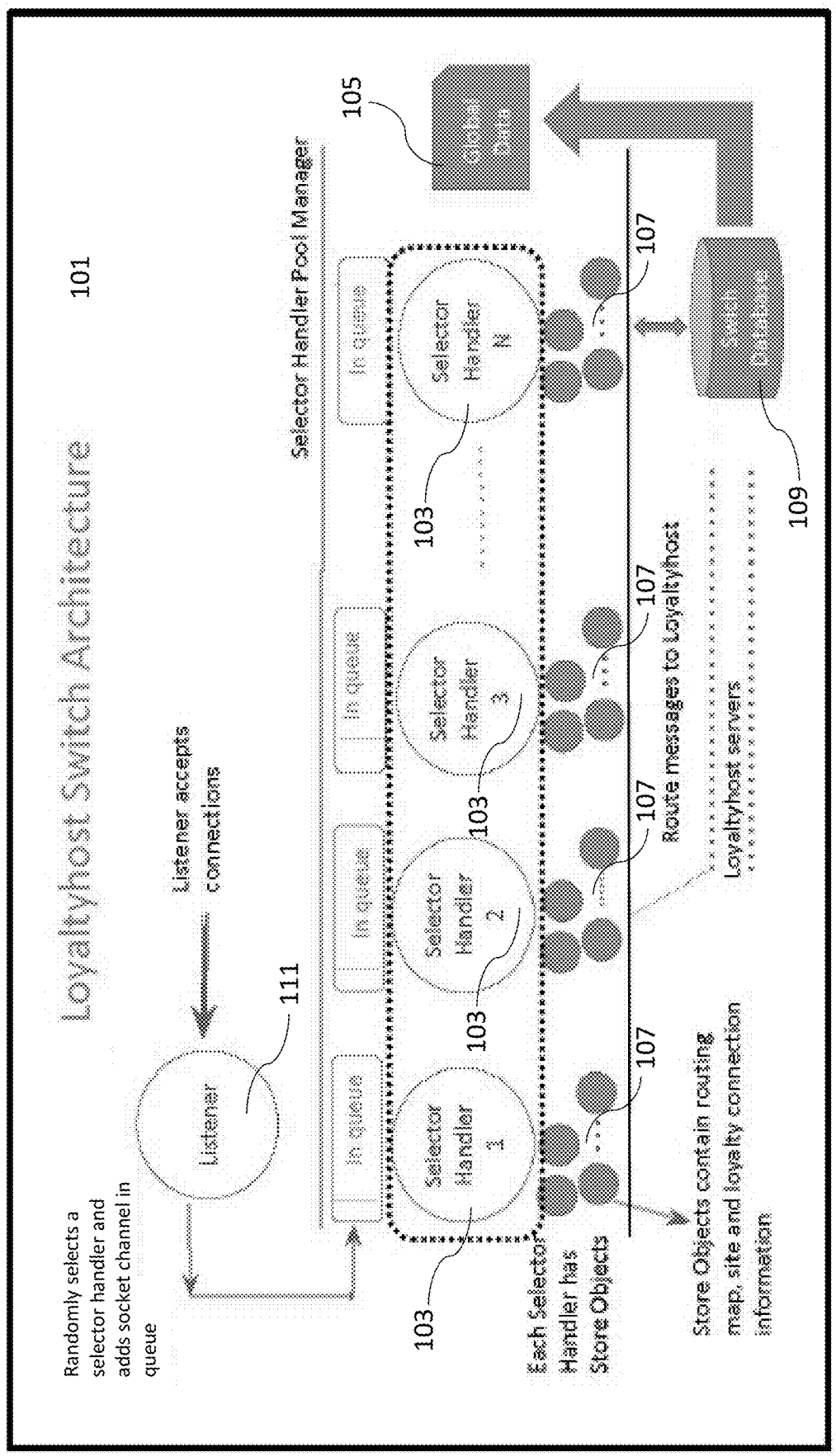
FIG. 1 shows a loyalty switch architecture according to an exemplary embodiment.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description, a discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

According to an exemplary embodiment, and referring to the Figures generally, a system and a method of a loyalty switch may be shown and described. To remedy the above-mentioned limitations, the loyalty switch may be positioned in between the company's stores and one or more or all loyalty hosts: loyalty program, partner program, CPG coupons partner, etc. Based on configuration options, a loyalty switch may examine loyalty messages and route the messages to one or more loyalty hosts. The loyalty switch may also examine responses and route the responses back to the stores.

According to an exemplary embodiment, a loyalty switch may enable stores to communicate with more than one loyalty host using a national loyalty interface without changes to any communication protocol or functions on both a store side and a loyalty host side. For every connection established from the store, the loyalty switch may attempt to connect to all loyalty hosts to which the store is configured to communicate to.

According to an exemplary embodiment, the loyalty switch may include one or more of the following (but non-limiting) features: (1) If connection with at least one loyalty host can be established/maintained, the switch may maintain the store connection and perform store and forward functionality until unavailable hosts come online; (2) All switch connection and communication functions may be done concurrently with all loyalty hosts (no blocking calls); (3) The switch may broadcast messages to all loyalty hosts that do not have a loyalty id and or loyalty sequence id, i.e. GetLoyaltyOnlineStatusRequest, BeginCustomerRequest, EndCustomerRequest and EndOfPeriodRequest, and Last GetLoyaltyOnlineStatusRequest may always be preserved for the store; (4) The switch may use a sequencing logic (described below) to determine which loyalty host may be selected for the remaining purchase messages if routing logic for the used loyalty id results in multiple loyalty hosts; (5) For unavailable loyalty hosts, the switch may, on configurable frequency, attempt to reconnect to the hosts, and if the switch is reconnected to the hosts, then the switch may first send stored GetLoyaltyOnlineStatusRequest, declare the host as online to allow processing of incoming GetRewardsRequest messages, and then may start sending stored and forwarded messages in the order that have been received. Any new finalize/reversal/cancellation and end of period may be put at the end of the queue; (6) The switch may handle offline messages without a loyalty sequence id. In a case where the loyalty id resolves in more than one host, then a sequencing logic may be applied; (7) The switch may send keep-alive messages to idle loyalty host connections. Frequency may be stored on the host level and may be configurable via admin GUI; (8) In a case where a loyalty host is down, GetRewardsRequest may be ignored, which may trigger a timeout on the store level, after which the store would submit a keep-alive message followed by an offline finalize/cancel message; (9) The switch may store and forward offline messages; and (10) The switch may process EndOfPeriodRequest using stored transactions in the database, provide a response back to the store, and then may forward the request to all loyalty hosts. When a response is received from each loyalty host, information of the response may be reconciled with a response sent to the store. If there are discrepancies, an exception report may be created. For unavailable hosts, a request may be stored as an offline message.

According to various exemplary embodiments of the present invention, a computer implemented method for connecting a client computing resource with at least one loyalty host computing resource may include the following steps: receiving a first message from the client computing resource by a loyalty switch to initiate a client connection, the loyalty switch having a client message queue, a selector handler pool manager, and one or more selector handlers; storing the first message within the client message queue; assigning the client computing resource to an assigned selector handler from the one or more selected handlers by the selector handler pool manager; establishing the client connection between the client computing resource and the assigned selector handler; receiving a transaction message from the client computing resource over the client connection; determining a matching loyalty host computing resource from the at least one loyalty host computing resource by the assigned selector handler using selector routing logic; responsive to a determination that a host connection does not exist between the assigned selector handler and the matching loyalty host computing resource, establishing the host connection; transmitting the transaction message over the host connection to the matching loyalty host computing resource; and transmitting a client response message by the assigned selector handler over the client connection indicating a status indication in response to the transaction message, the status indication including a success indication and a failure indication.

According to an exemplary embodiment, the method for connecting a client computing resource with at least one loyalty host computing resource may further include receiving a host response message from the matching loyalty host computing resource containing the status indication.

According to an exemplary embodiment, the method for connecting a client computing resource with at least one loyalty host computing resource may also include: responsive to a determination that the host connection does not exist and the matching loyalty host computing resource is offline, storing the transaction message within the assigned selector handler for transmission once the host connection is established.

According to various embodiments of the computer implemented method for connecting a client computing resource with at least one loyalty host computing resource, determining the matching loyalty host computing resource using selector routing logic may include: identifying a request type for the transaction message; responsive to the request type being forward all, storing the transaction message within a write buffer corresponding to all host connections associated with the at least one loyalty host computing resources supporting the client computing resource; responsive to the request type being reverse transaction, fetching a server ID associated with the reverse transaction and storing the transaction message within the write buffer corresponding to the server ID; responsive to the request type not being loyalty ID, fetching the server ID associated with a loyalty sequence ID of the transaction message and storing the transaction message within the write buffer corresponding to the server ID; responsive to the request type being loyalty ID and the loyalty sequence ID being null, fetching the server ID associated with a loyalty sequence ID of the transaction message and storing the transaction message within the write buffer corresponding to the server ID; and responsive to the request type being loyalty ID and the loyalty sequence ID not being null, perform the following: responsive to matching a pattern with the loyalty ID with all host connections associated with the at least one loyalty host computing resources, identifying the server ID of the matching pattern; and storing the transaction message within the write buffer corresponding to the server ID of the matching pattern.

According to another exemplary embodiments of the method for connecting a client computing resource with at least one loyalty host computing resource, determining the matching loyalty host computing resource using selector routing logic may include: responsive to unsuccessfully matching a pattern with the loyalty ID with all host connections associated with the at least one loyalty host computing resources, passing the transaction message to a multiprogram matcher to the server ID of the at least one loyalty host computing resource to receive the transaction message; storing the transaction message within the write buffer corresponding to the server ID; and transmitting the write buffer to the loyalty host computing resource.

Turing now to FIG. 1, a loyalty switch architecture may be described. According to an exemplary embodiment, a switch 101 may have a configurable number of selector handlers (i.e., a selector handler pool) 103. The switch 101 may accept connection from stores (not shown in the drawing), may read loyalty host information from global data 105 to establish a connection with a loyalty host (not shown in FIG. 1), and may route messages to the loyalty host. Each selector handler 103 in the switch 101 may have multiple store objects 107 that may include a routing map and connection information from partner companies and loyalty hosts. The switch 101 may store information of message types such as FinalizeRewardsRequest and/or ReverseTransactionRequest information in a switch database 109.

Figure 2:
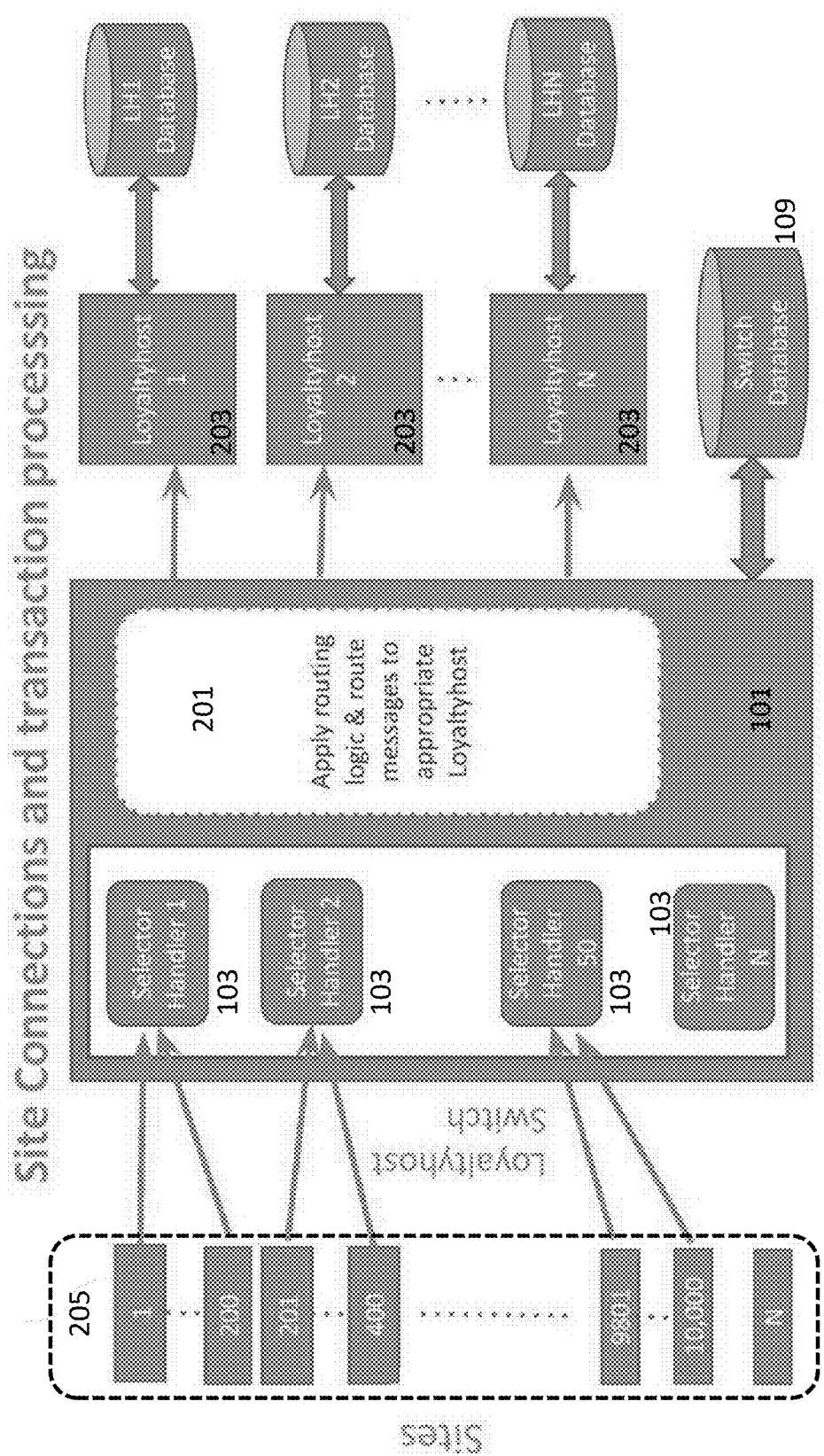
FIG. 2 shows site connections and transaction processing on a loyalty switch according to an exemplary embodiment.

Turning now to FIG. 2, site connections and transaction processing on a loyalty switch may be described. According to an exemplary embodiment, a message routing load may be distributed on parallelly executing selector handlers 103 on switch 101. Each selector handler 103 may handle approximately two hundred site 205 connections and route them on an appropriate loyalty host 203 after applying a routing logic 201. Sending a response back to a client (a site or a store) 205 may also be handled by parallelly executing selector handlers 103. Reads and writes of the messages may be done asynchronously.

Figure 3:
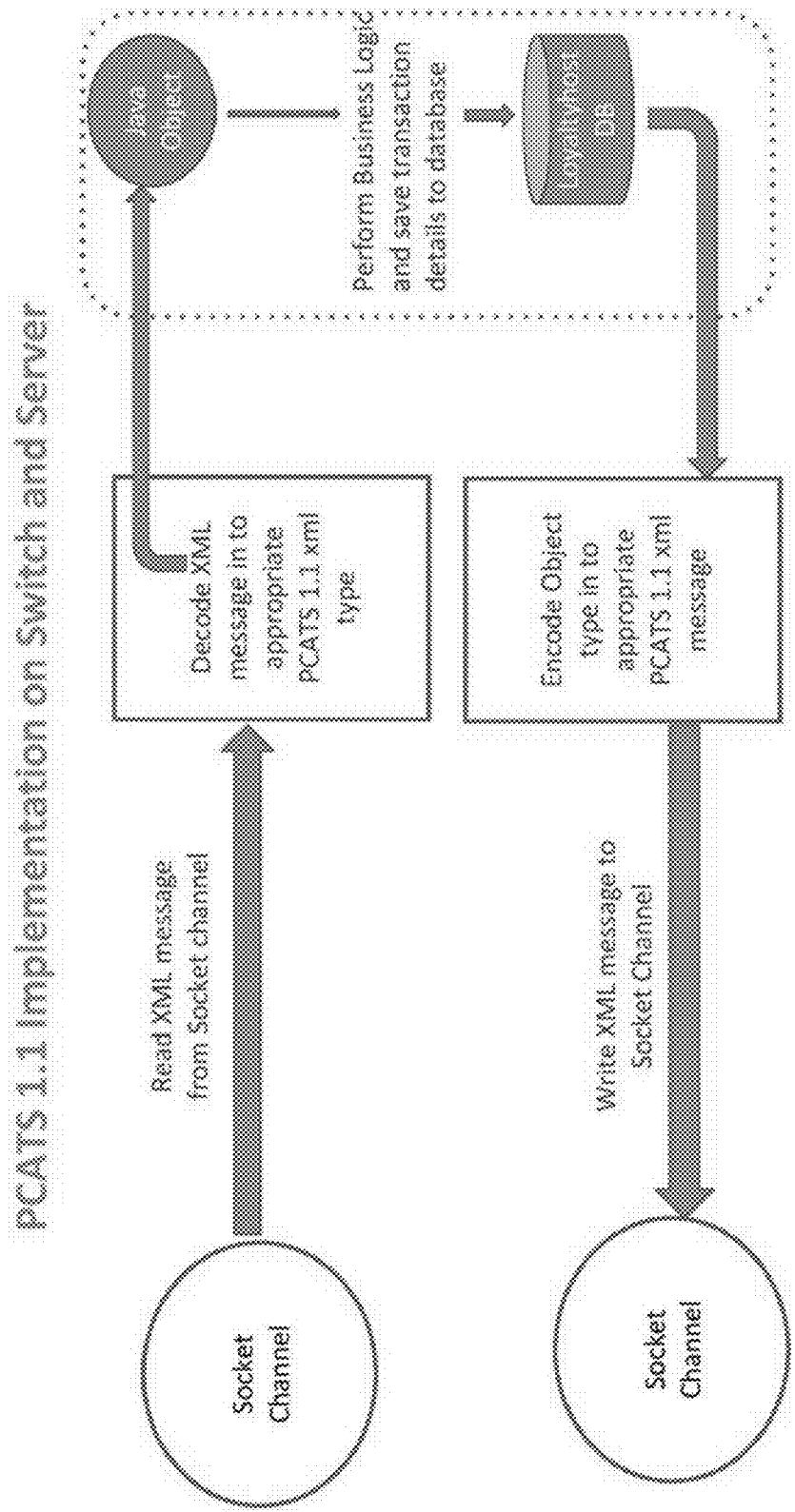
FIG. 3 shows an implementation of Petroleum Convenience Alliance for Technology Standards (PCATS) on Switch and Server according to an exemplary embodiment.
Figure 4:
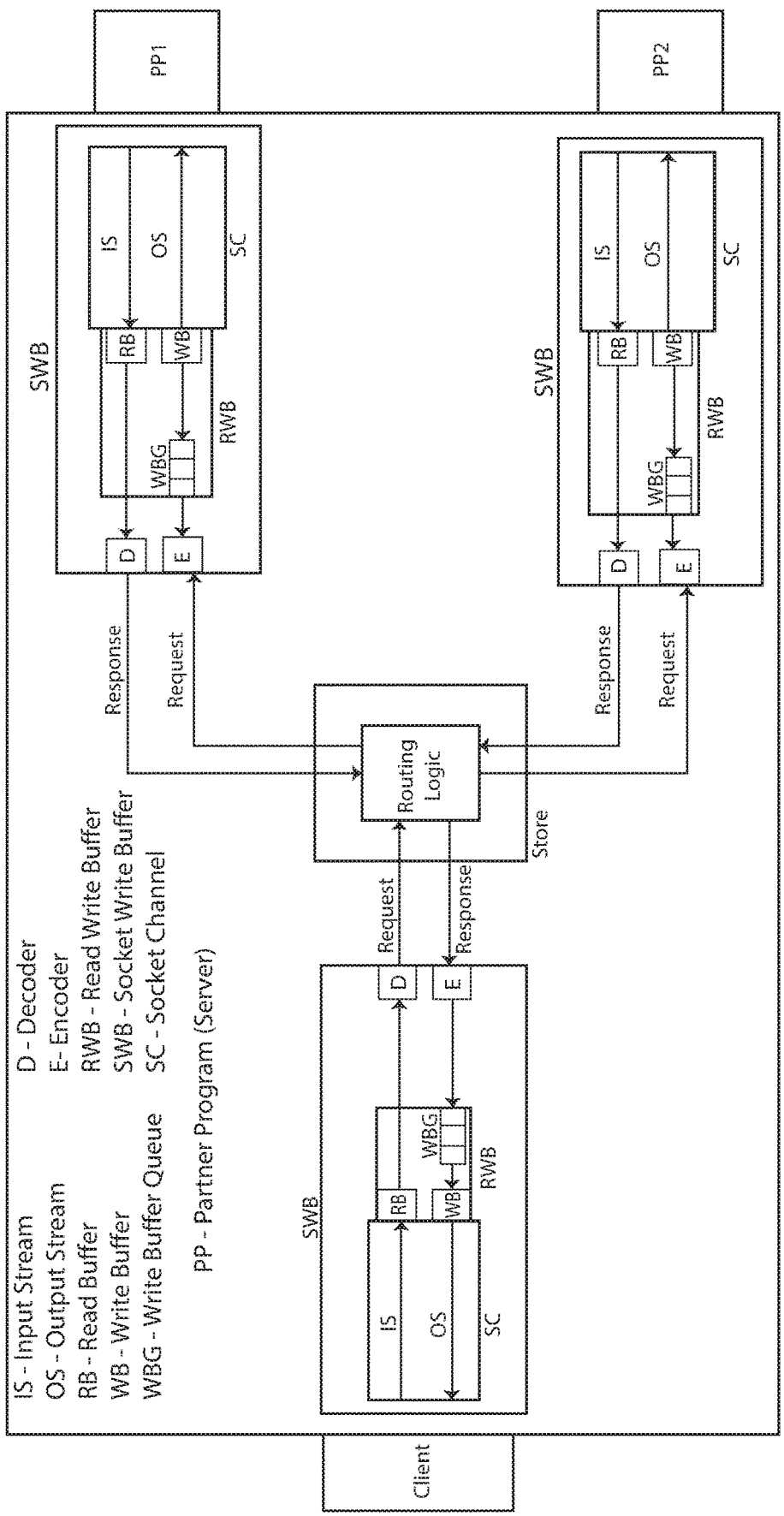
FIG. 4 shows a programmatic overview of a loyalty switch according to an exemplary embodiment.

Turing now to FIGS. 3 and 4, FIG. 3 may show an implementation of Petroleum Convenience Alliance for Technology Standards (PCATS) or CONEXXUS on Switch and Server and FIG. 4 may show a programmatic overview of a loyalty switch. According to an exemplary embodiment, PCATS v1.1 or CONEXXUS 1.1 may be used as a communication protocol with stores 205 and loyalty host(s) 203. The switch 101 may maintain one connection per a store 205 to ensure no changes are required on the loyalty host 203 side.

Figure 5:
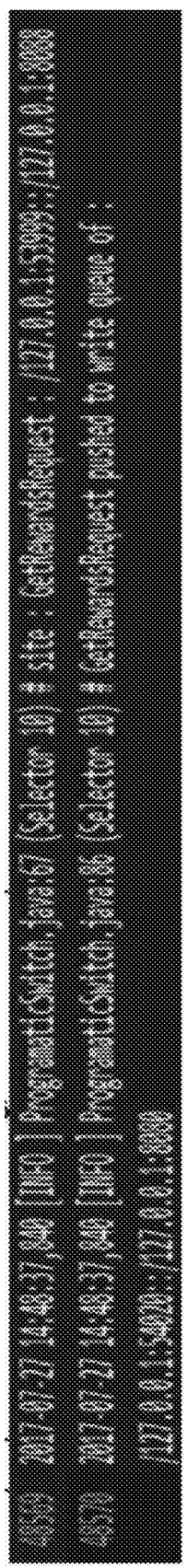
FIG. 5 shows an example of switch logs for incoming and outgoing site message routing information according to an exemplary embodiment.

Turing now to FIG. 5, an example of switch logs for incoming and outgoing site message routing information may be shown. According to an exemplary embodiment, Messages may be logged in different log levels, for example ERROR, DEBUG, INFO and also, custom levels may be defined for server status. By way of example, in the first line of the message of FIG. 5, GetRewardsRequest is being received on the switch (\\127.0.0.1:8088) from the site (//127.0.0.1:53999) and in the second line, the socket channel (\\127.0.0.1:54020) connected to the loyalty host server (\\127.0.0.1:8080) routes the message to the loyalty host server (\\127.0.0.1:8080). All finalized transactions may be stored in the switch database 109.

According to an exemplary embodiment, functionality of a loyalty switch 101 may be implemented in multiple phases. An initial phase may include routing loyalty transactions to one loyalty host 203 only. From the loyalty host 203 perspective, a loyalty switch 101 may appear as a store 205, and to a store 205, the loyalty switch may appear as the loyalty host 203. No changes to the loyalty host 203 and store 205 hardware/software configuration may be required. The loyalty switch 101 may be designed to handle, for example, from fifty to two hundred transactions per second with minimal message routing latency.

According to an exemplary embodiment, a loyalty switch 101 may be listening for incoming store connections on a configured TCP/IP port. When a connection is accepted, a listener (reference number 111 in FIG. 1) may pass a connection to one of the selector handlers 103 by using a round robin selection method. For every established connection, a selector handler 103 may attempt to connect to all configured loyalty hosts 203 for the connecting store 205 when a first message is received. A TCP/IP connection with the store 205 may be maintained as long as at least one connection with one of the store's 205 configured loyalty host 203 is maintained. If the connection cannot be established with at least one required loyalty host 203 or connections with all required loyalty hosts 203 are lost due to their unavailability, then connection with the store 205 may also be closed. Each store 205 connection may be logically connected with all corresponding loyalty host 203 connections based on a store object 107. To optimize performance and concurrency in communication with all stores 205, the TCP/IP communication, including establishing connection to loyalty hosts 203 and reading/writing messages from and to stores 205 and loyalty hosts 203, may be handled asynchronously. Acceptance of new store 205 connections may be handled by a dedicated thread, e.g. a listener 111, and may be implemented using synchronous blocking calls.

Also, in an exemplary embodiment, a POS (point of sale) (for example, VeriFone Commander) may maintain an open TCP/IP socket connection with the loyalty host 203 at all times. When a connection is dropped, the POS may reconnect. This may require the loyalty switch 101 to maintain a pool of connections with all participating sites 205. According to exemplary embodiments, the following multi-threaded architecture may be provided: (i) one listener 111 may be provided, and the listener 111 may be a thread that listens for incoming store 205 connections on a TCP/IP server socket. When the connection is accepted, the listener 111 may pass connection to one of the selector handlers 103 by using mod function on the number of selector handlers 103 and go back to the listening mode for other incoming connection(s); and (ii) a configurable pool of selector handlers 103 may be provided, and selector handlers 103 may be threads that listen/pool simultaneously (e.g., using select ( ) java method) for read, write and connect readiness on multiple TCP/IP sockets.

According to an exemplary embodiment, when a socket(s) is ready for one of the actions listed above, the following action may be taken by the selector handler 103: The Programmatic Switch attachment may be gotten from a selected key and an execute method may be called on it; if Connect ready, finishConnect( ) may be called to check if connection is established. If connection is established, then interest ops of the key may be changed from the connection to read and sustain a write, and it may be checked if the connection is a last loyalty host 203 connection for the store 205 that the connection is associated with. If it is the last connection, then pending message(s) may be sent to the required loyalty hosts 203 using business logic (reference number 201 in FIG. 2—a routing logic. Also, described in FIG. 6). If the message was sent partially, then the rest of the bytes may be written in the next selected attempt.

Figure 6:
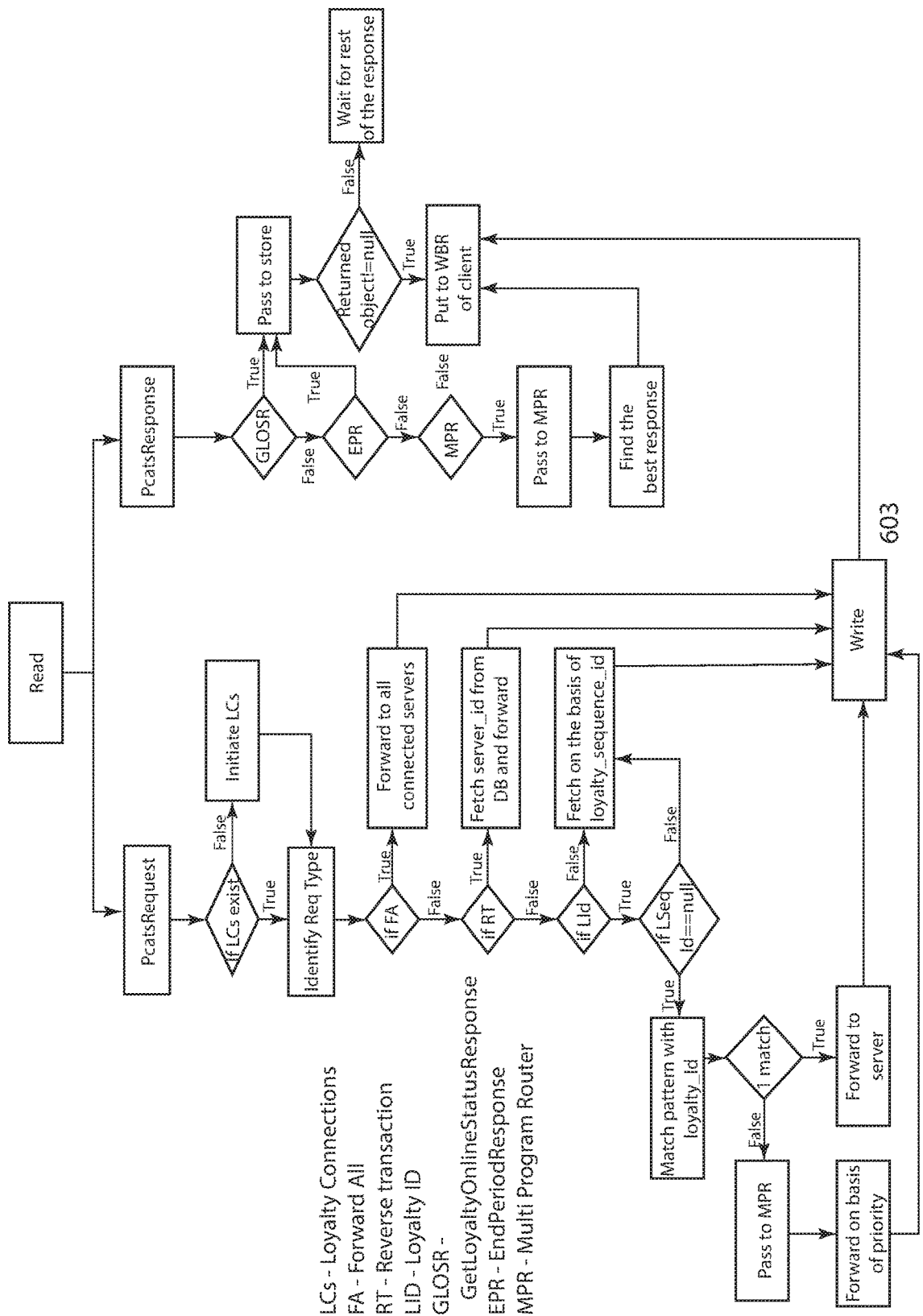
FIG. 6 shows a routing logic flow of a loyalty switch according to an exemplary embodiment.
Figure 7:
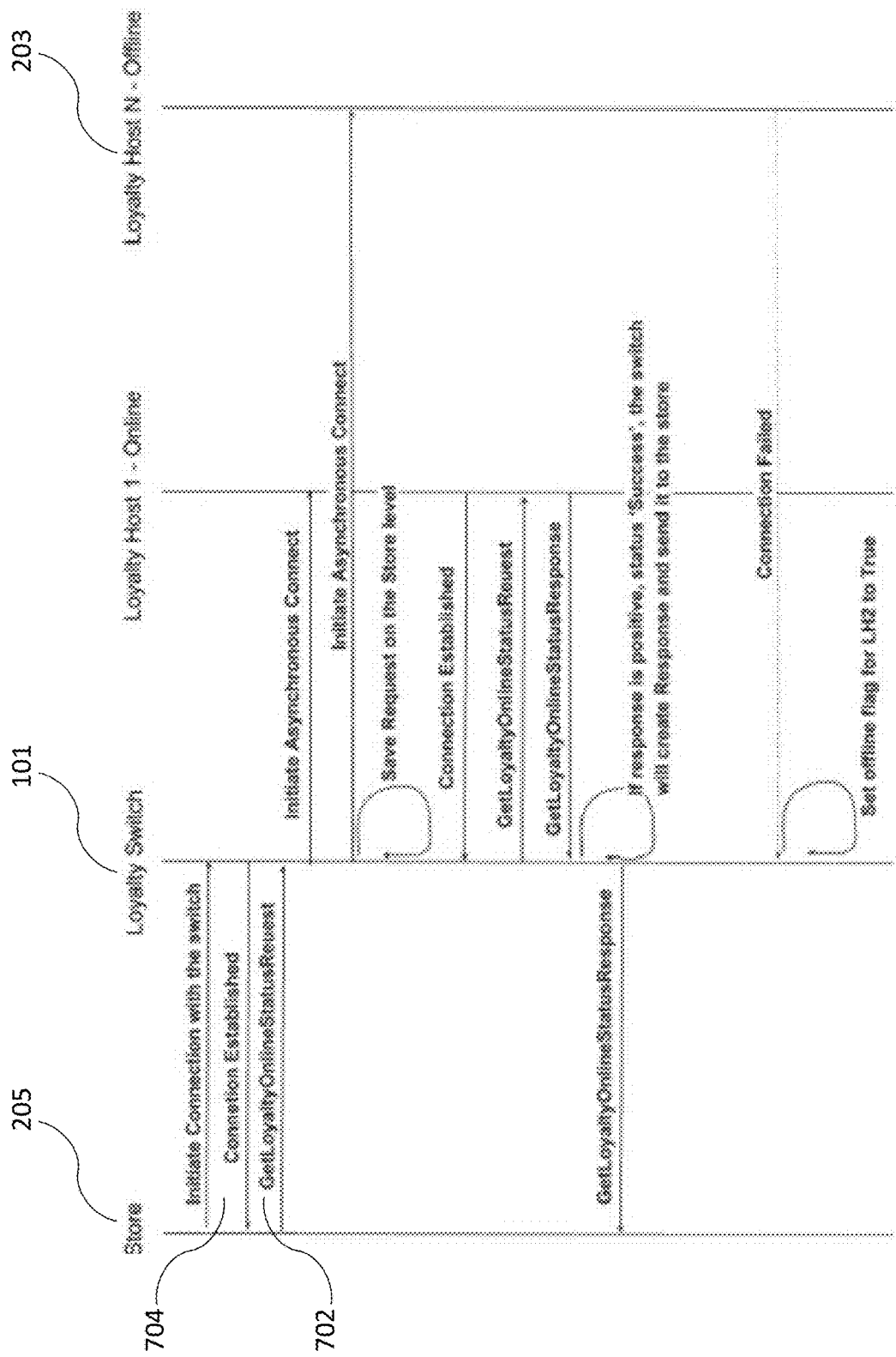
FIG. 7 shows a message flow diagram according to an exemplary embodiment.

Turning now to FIG. 6, a message routing logic of a loyalty switch may be described. According to an exemplary embodiment, if it is Read ready 601 after the Connect ready, and the connection is a store connection 205 (e.g., CONEXXUS Request), then data may be read. If the data is not a complete message, then the rest of the data may be read in the next read readiness of the selection key. If the entire message is received, then a transaction LoyaltySequenceID (unique transaction id assigned by the assigned loyalty host 203) may be extracted and it may be determined if there is an assigned loyalty host 203 for this purchase (which is not applicable to GetLoyaltyOnlineStatusRequest, BeginCustomerRequest, EndCustomerRequest and EndOfPeriodRequest messages). If any loyalty host 203 is assigned, then a message may be sent asynchronously to the assigned loyalty host 203 (if message not completely sent, connection may be registered for write readiness with the selector 103).

According to an exemplary embodiment, if a loyalty host 203 is not assigned, then an additional business logic may be processed as follows: If the message is GetLoyaltyOnlineStatusRequest, and no connections with loyalty hosts 203 have been initiated yet for the store 205 connection, then SiteID may be taken from the message header. Connections may be simultaneously initiated with loyalty hosts 203 based on a store level configuration which specifies to which loyalty hosts 203 the store 205 should be connected to (e.g., using asynchronous connect ( ) method), and new connection(s) may be added into the multiplexer (selector handler 103) for a connect readiness. Loyalty host 203 connection(s) may be linked with the associated store 205 connection (e.g. based on java Store object 107) which may store the SiteID and a timestamp when store object 107 was created. The store connection 205 may be removed from the multiplexer (selector handler 103) and GetLoyaltyOnlineStatusRequest message may be stored within the store object 107 until connections with all loyalty hosts 203 are established.

Also, in an exemplary embodiment, if connections cannot be established with any of the loyalty hosts 203 that store 205 is configured to be connected to, then the store 205 connection may be closed as well. This may trigger a reconnect logic by the store 205. As soon as connection with at least one loyalty host 203 can be established, then the received message may be forwarded to the host 203 without waiting for other connections to be established. On the store object 107 level for loyalty host 203 where connection was not established, an offline flag may be set as true.

In an exemplary embodiment, if the message is GetLoyaltyOnlineStatusRequest, BeginCustomerRequest, EndCustomerRequest and/or CancelRedemptionRequest, then the received message may be sent asynchronously to all associated loyalty host connections 203. If the message is not completely sent, then connection(s) may be registered for a write readiness with the selector handler 103 or the message may be added to the output buffer if already registered for the write readiness. If the received message is GetLoyaltyOnlineStatusRequest, then for loyalty hosts 203 with an offline flag set as true, the loyalty switch 101 may attempt to establish connections with the loyalty hosts 203. A store connection 205 may be removed from the multiplexer (selector handler 103) and the received message may be stored within the store object 107 until connections with all loyalty hosts 203 are established. The received message may replace previously saved GetLoyaltyOnlineStatusRequest. If the connections with all loyalty hosts 203 are established, then the received message may be sent to the host 203 as described above. If not, the offline flag may remain true and such host 203 may not be waited on when a response is prepared to be sent to the store 205. For offline hosts 203, BeginCustomerRequest, EndCustomerRequest, CancelRedemptionRequest messages may be ignored.

In another exemplary embodiment, if the message is GetRewardsRequest and/or GetRewardStatusRequest, and if a transaction route has not been already established (check in memory hash table), then a business logic may be applied using a combination of store id and/or loyalty id to determine to which loyalty host 203 the received message should be asynchronously sent to. The message LoyaltySequenceID and the selected loyalty host 203 may be stored in the local hashtable associated with store object 107 and persisted in the database 109, and the message may be sent to the assigned loyalty host 203. If the message is not completely sent, then the connection may be registered for a write readiness with the selector 103 or the message may be added to the output buffer if already registered for the write readiness.

Further, in an exemplary embodiment, if the message is GetRewardsRequest and the selected loyalty host 203 is not available (offline flag is set to true), then the switch 101 may send a GetRewardsResponse message with overall status "Success" and a message that informs the customer that currently rewards are not available and that purchases may be used for future rewards accumulation. If the maximum number of stored and forwarded messages has been reached for the store 205, then the switch 101 may send a GetRewardsResponse with overall status "Failure" and a message that informs the customer that currently rewards are not available and that purchases will not be considered for a future rewards accumulation.

In another exemplary embodiment, if the message is GetRewardsRequest and the selected loyalty host 203 is not available (offline flag is set to true), the switch 101 may ignore the message, which may trigger time out on the store level 205. The store 205 may follow with GetLoyaltyOnlineStatusRequest message. When a response sent properly by the switch 101, store 205 may submit an offline finalize or a cancel message.

In an exemplary embodiment, if the message is GetCustomerMessagingRequest, then the transaction route may be retrieved from the internal hashtable associated with the store object 107 and the message may be sent to the assigned loyalty host 203. If the message is not completely sent, then the connection may be registered for a write readiness with the selector 103 or the message may be added to the output buffer if the connection is already registered for a write readiness. If the selected Loyalty Host is not available, then the message may be ignored.

In another exemplary embodiment, if the message is CancelTransactionRequest and/or FinalizeRewardsRequest, then a transaction route may be retrieved from an internal hashtable associated with the store object 107. If the transaction route is not found and the received message is an offline message (LoyaltyOfflineFlag is set to Yes), then the transaction route may be retrieved from the database 109 and the message may be sent to the assigned loyalty host 203. If the transaction route is not found in the database 109, then a "Failure" which is supported by CONEXXUS may be responded to the store 205. If the message is not completely sent, then the connection may be registered for a write readiness with the selector 103 or the message may be added to the output buffer if already registered for the write readiness.

In an exemplary embodiment, if the message is FinalizeRewardsRequest, then a purchase transaction record may be inserted into the database. For example, the purchase transaction record may include: TXN_REFERENCE (POS sequence, store id and POS time stamp); TXN_TIME (Transaction date and time provided by the POS); TIME_ZONE (Time zone of the POS Txn Time); FINALIZE_RECEIVED_TIME (Timestamp when finalize request was received by the switch); FINALIZE_PROESSING_TIME (Finalize request switch processing time (e.g., milliseconds); RECORD_INSERT_TIME (Timestamp when transaction record was inserted into database); LOYALTY_SEQUENCE_ID (Unique transaction reference assigned by the loyalty host); LOYALTY_HOST_ID (Host ID assigned by the switch to the loyalty host that processed the transaction); PROGRAM_ID (Program that transaction is associated with—e.g., Driver Rewards, United, AAA, Kroger, etc.—this is assigned by the switch as long as it is used, loyalty host may not handle more than one program); LOYALTY_ID (Loyalty ID used in transaction, last 4 digits only); REGULAR_SELL_PRICE (Regular fuel price—pre POS and loyalty discounts); PRICE_PER_GALLON (Price per gallon that customer paid); GALLONS_PUMPED (Number of gallons pumped in the transaction); FUEL GRADE (Fuel grade pumped); TOTAL_ITEM_SALES (Total Items sales—items that have PLU or SKU); TOTAL_MERCHANDISE_SALES (Total merchandise sales—general department sales—no PLU or SKU only department info); TOTAL_TAX_AMOUNT (Total tax amount); TOTAL_AMOUNT (Total transaction amount); LOYALTY_CENTS_OFF_PER_GALLON (Number of cents off per gallon given by the loyalty host); TOTAL_LOYALTY_DISCOUNT (Total loyalty discount provided by the loyalty host either as cents off or transaction level discount); POS_DISCOUNT CPG (Non loyalty CPG discount); POS_ID (POS ID from where transaction originated from); BATCH_ID (Batch ID transaction is associated with); CASHIER_ID (Identifies the cashier or attendant conducting the transaction, if any); STATUS (SUCCESS—successful purchase, or REVERSED—reversed transaction); NON FUEL_LOYALTY_DISCOUNT (Sum of all the line item loyalty discounts present on the non-fuel items); and Any other field needed to produce EndOfPeriodResponse, i.e. BusinessPeriod info.

In another exemplary embodiment, if the transaction for assigned loyalty host 203 is offline, and the message is CancelTransactionRequest or FinalizeRewardsRequest, then the message may be stored in the database 109 and forwarded to the assigned loyalty host 203 when the connection is re-established with the host 203. If the message is not an offline message (LoyaltyOfflineFlag='No'), then it may be ignored.

In an exemplary embodiment, if the received message is offline FinalizeRewardsRequest or CancelTransactionRequest without a loyalty sequence id, then routing rules may be applied on the loyalty id and the message may be forwarded to the correct loyalty host 203. If the result is more than one loyalty host 203, then sequencing logic may be applied to determine the correct loyalty host 203 (described in further detail below).

In another an exemplary embodiment, if an offline FinalizeRewardsRequest message exceeds the store 205 forward queue size limit, then an error event may be recorded and made available for daily reporting. Also, in an exemplary embodiment, for a predetermined number of messages over the forward limit (e.g., 100 messages), an error event may be created and stored in the database 109. When this event is recorded, the system administrator(s) may receive a warning email.

Also, in an exemplary embodiment, if the message is ReverseTransactionRequest, then the Original POSTransactionID may be extracted from the message, and the loyalty host 203 that was used to process the original transaction may be determined by querying the database 109. The message may be sent to the loyalty host 203. If the message is not completely sent, then the connection may be registered for a write readiness with the selector 103 or the message may be added to the output buffer if already registered for the write readiness. If the original transaction is not in the database 109, then the request may be rejected by sending one of the failure codes supported by CONEXXUS. If the original transaction of assigned loyalty host 203 is offline, then the message may be ignored, which may trigger a store 205 to send an offline message. In another exemplary embodiment, if the original transaction of assigned loyalty host 203 is offline, then the message may be stored in the database 109 and forwarded when connection is re-established with the host 203. If the received message is an offline message, the offline flag may be set to true (LoyaltyOfflineFlag='Yes'), before the message is stored in the database.

If the message is EndOfPeriodRequest, then the switch 101 may prepare a response using stored redemption transactions from the switch database 109, and may respond back to the store 205 before forwarding a request to all loyalty hosts 203 that the store 205 is connected to. If the EndOfPeriodRequest message is not completely sent, then the connection may be registered for write readiness with the selector 103 or a message may be added to the output buffer if already registered for write readiness. The received message may be sent simultaneously and asynchronously to all associated loyalty host 203 connections. If the message is not completely sent, then connection(s) may be registered for write readiness with the selector 103 or the message may be added to the output buffer if the message is already registered for write readiness. If any of the loyalty hosts 203 that the store 205 is connected to are offline, then the received message may be stored in the database 109 (LoyaltyOfflineFlag changed to 'Yes') on the store object 107 level and forwarded when the connection is re-established.

According to an exemplary embodiment, if it is Loyalty Host (CONEXXUS Response) after the Connect ready, then data may be read, and if the data is not a complete message, then the connection may be put back to the selector 103 for a read readiness. If the entire message is received, then the message may be sent to the store 205. If the message is not completely sent, then the connection may be registered for a write readiness with the selector 103 or the message may be added to the output buffer if already registered for the write readiness.

In various exemplary embodiments, there may be exceptions, for example: (i) If the message is GetLoyaltyOnlineStatusResponse from loyalty hosts 203 that a store 205 is connected to, with status Success, then the switch 101 may assemble GetLoyaltyOnlineStatusResponse with a vendor and may send to the store 205 without waiting for other responses from other loyalty hosts 203. Other GetLoyaltyOnlineStatusResponse may be ignored; (ii) If the message is EndOfPeriodReponse, then the switch 101 may reconcile a response with transactions stored in the database 107, which is used to produce a response for the requested period to the store 205. If any discrepancy is found, the switch 101 may log an error and email details to the designated administrative email address; (iii) If the message is FinalizeRewardsResponse, then the LoyaltySequenceID and the loyalty host 203 assigned to it may be removed from the store hash table (store object 107), and the message may be sent to the assigned loyalty host 203. If the message is not completely sent, then the store 205 connection may be registered for a write readiness with the selector 103 or the message may be added to the output buffer if already registered for the write readiness.

According to an exemplary embodiment, if it is Write ready 603 after the Connect ready, then any remaining message and/or any other messages pending in the output buffer may be attempted to be sent. A socket may be removed from the selector 103 for a write readiness when all pending partial and/or full messages are sent.

According to an exemplary embodiment, if the connection is lost with one of the loyalty hosts 203, then the connection may be marked with the host 203 as offline by setting an offline flag to true. If this was the last online connection with the loyalty host 203, then all connections may be closed including the store 205 connection and the store object 107 may be deleted. If connection was lost with a store 205, then all connections may be closed with loyalty hosts 203 and the store object 107 may be destroyed.

Figure 8:
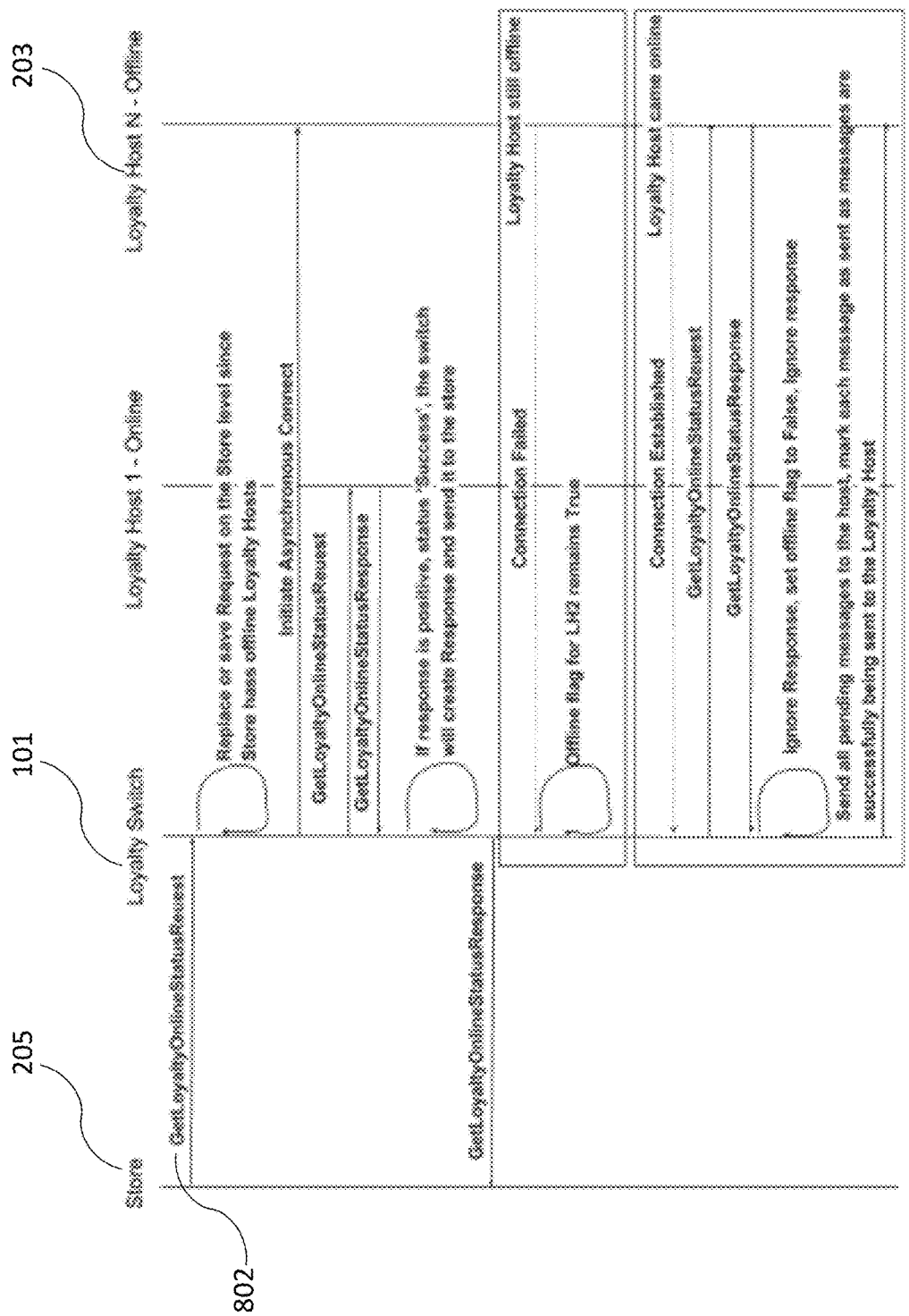
FIG. 8 shows a message flow diagram according to an exemplary embodiment.
Figure 9:
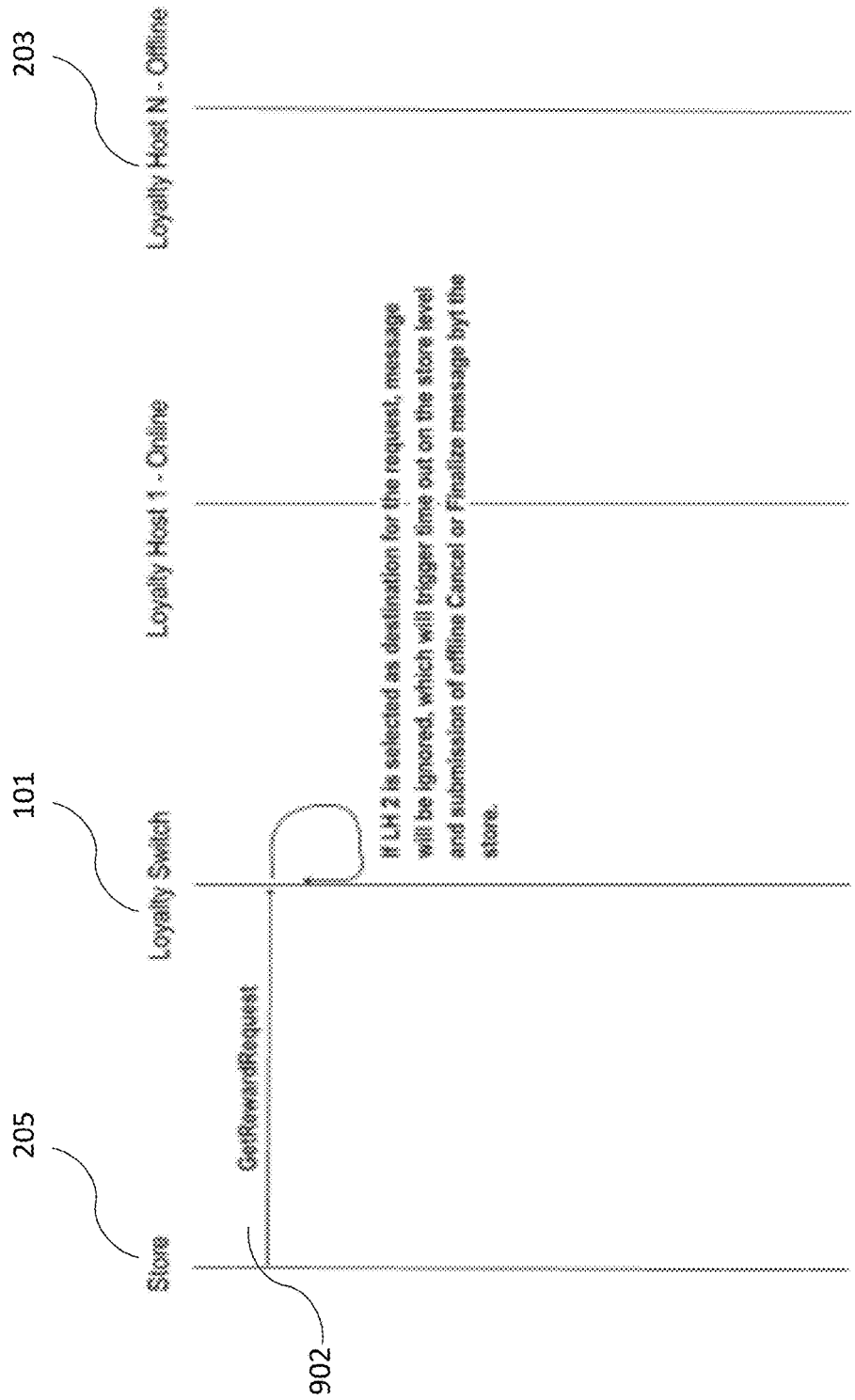
FIG. 9 shows a message flow diagram according to an exemplary embodiment.
Figure 10:
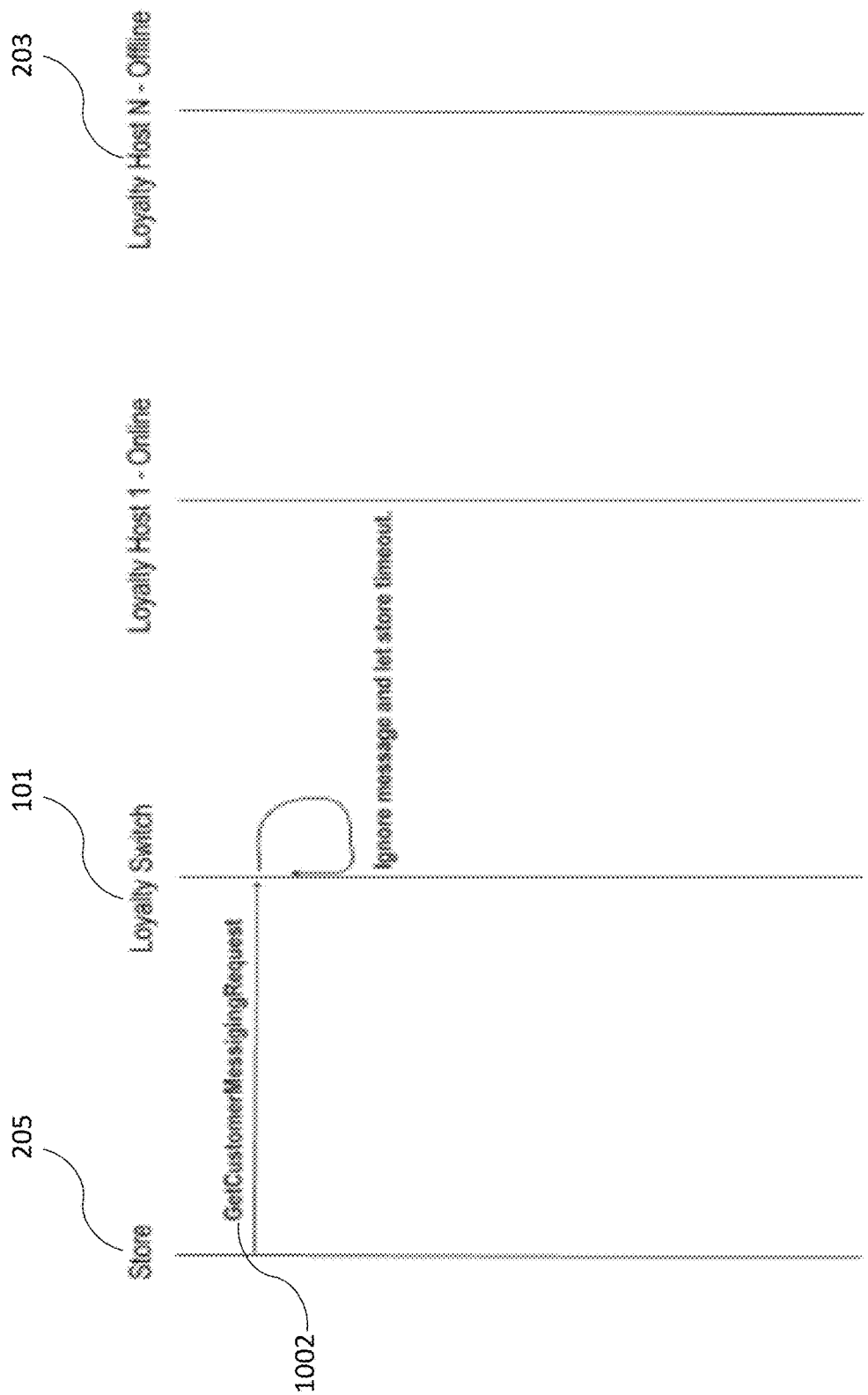
FIG. 10 shows a message flow diagram according to an exemplary embodiment.
Figure 11:
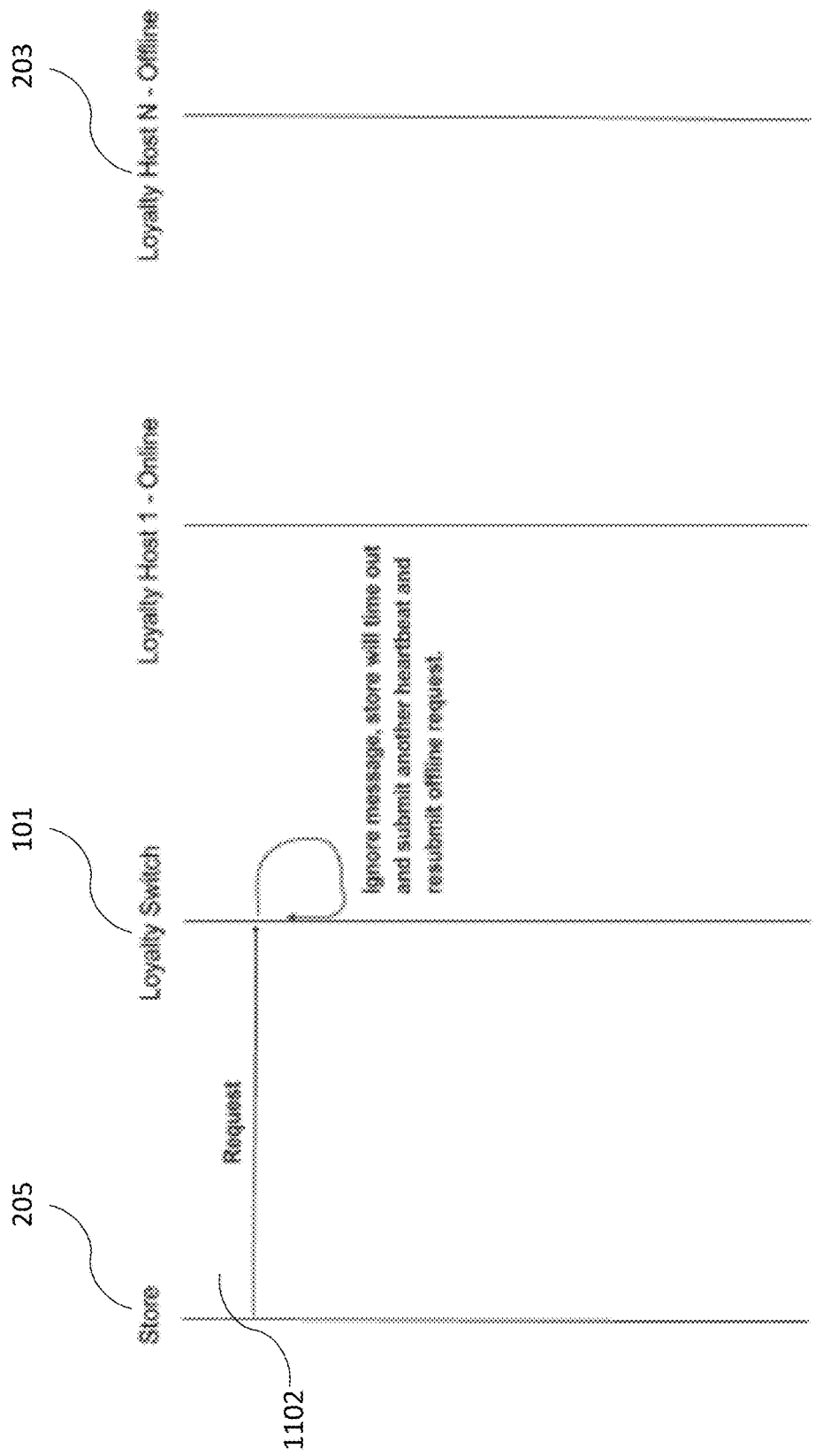
FIG. 11 shows a message flow diagram according to an exemplary embodiment.
Figure 12:
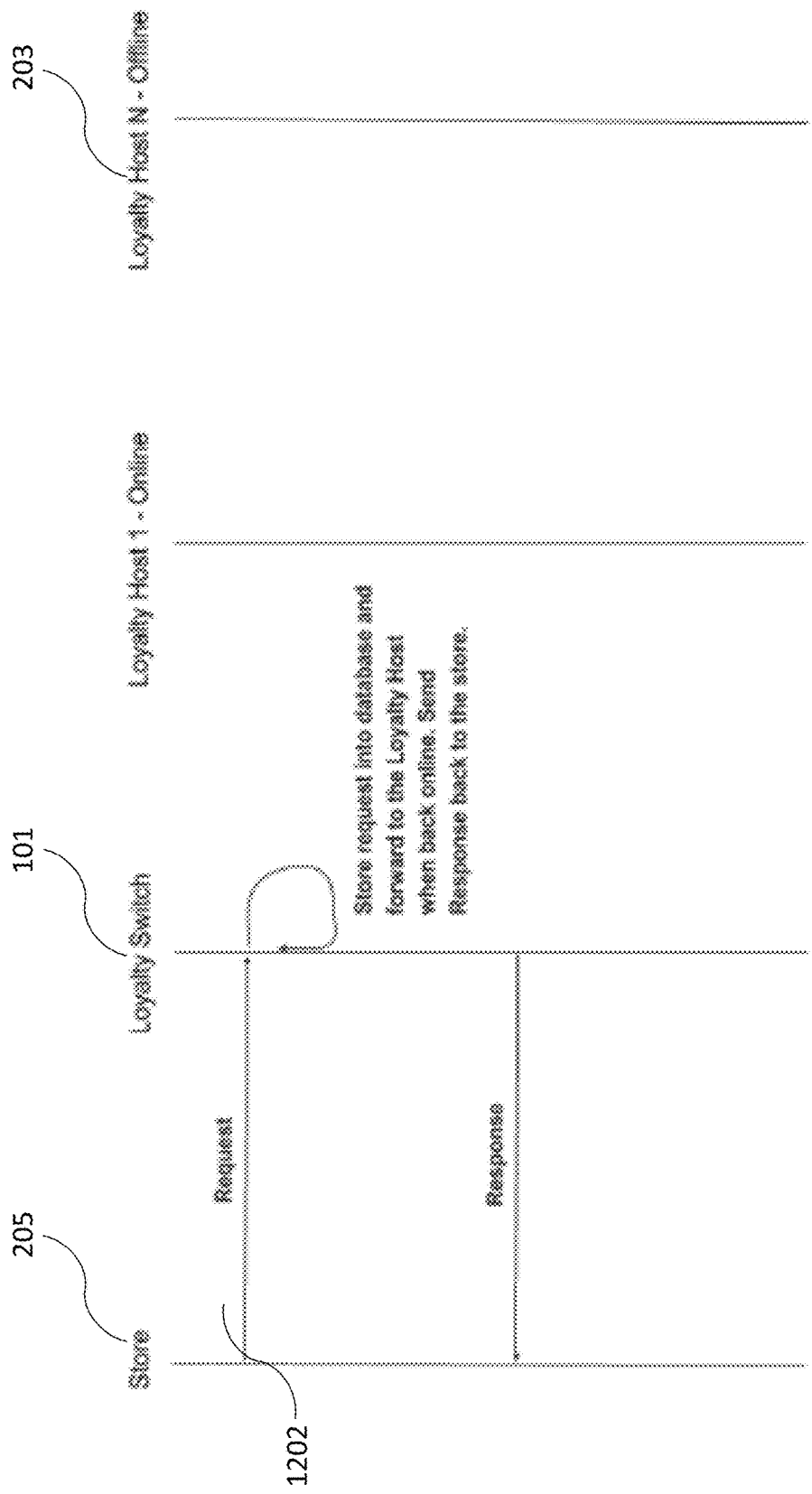
FIG. 12 shows a message flow diagram according to an exemplary embodiment.
Figure 13:
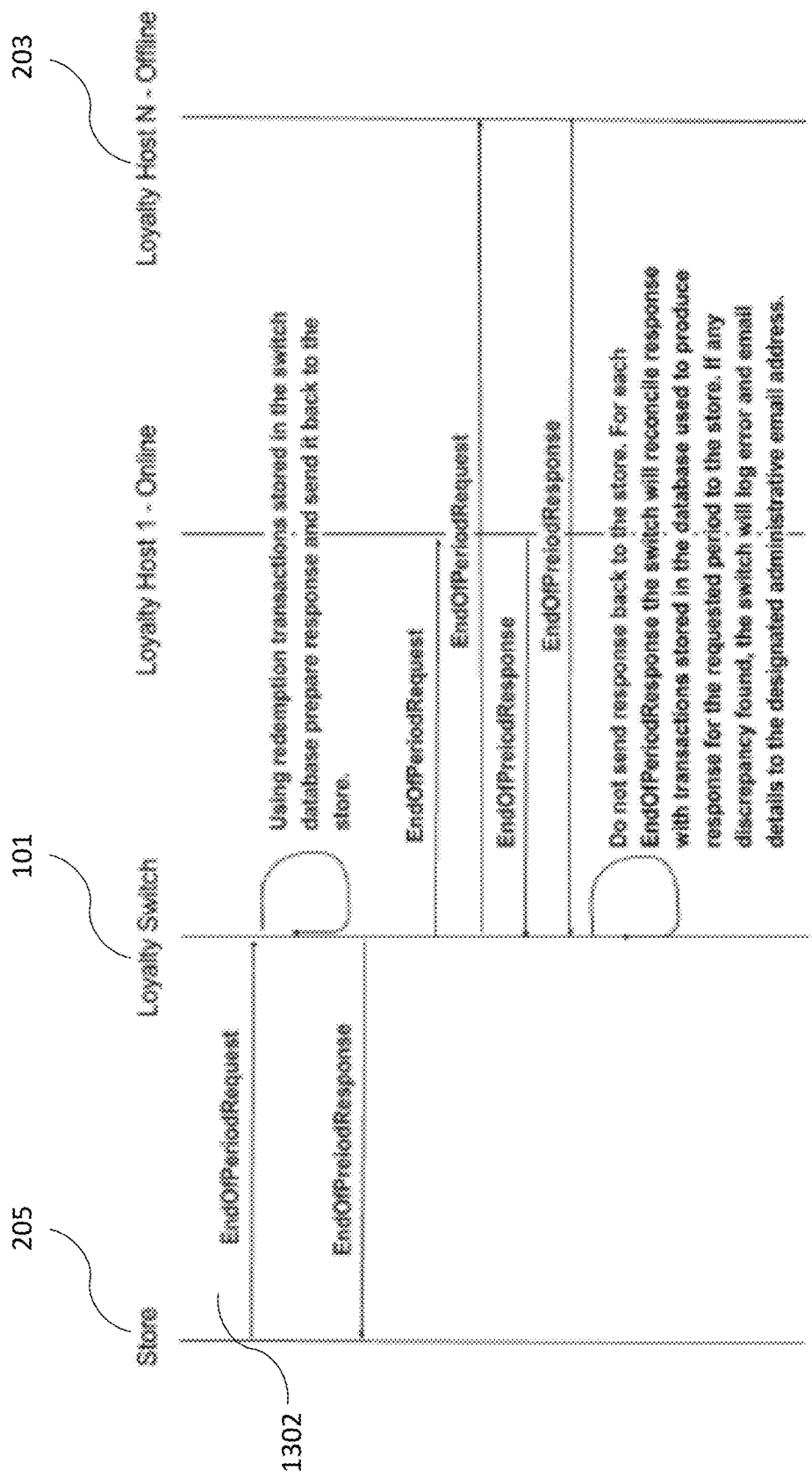
FIG. 13 shows a message flow diagram according to an exemplary embodiment.
Figure 14:
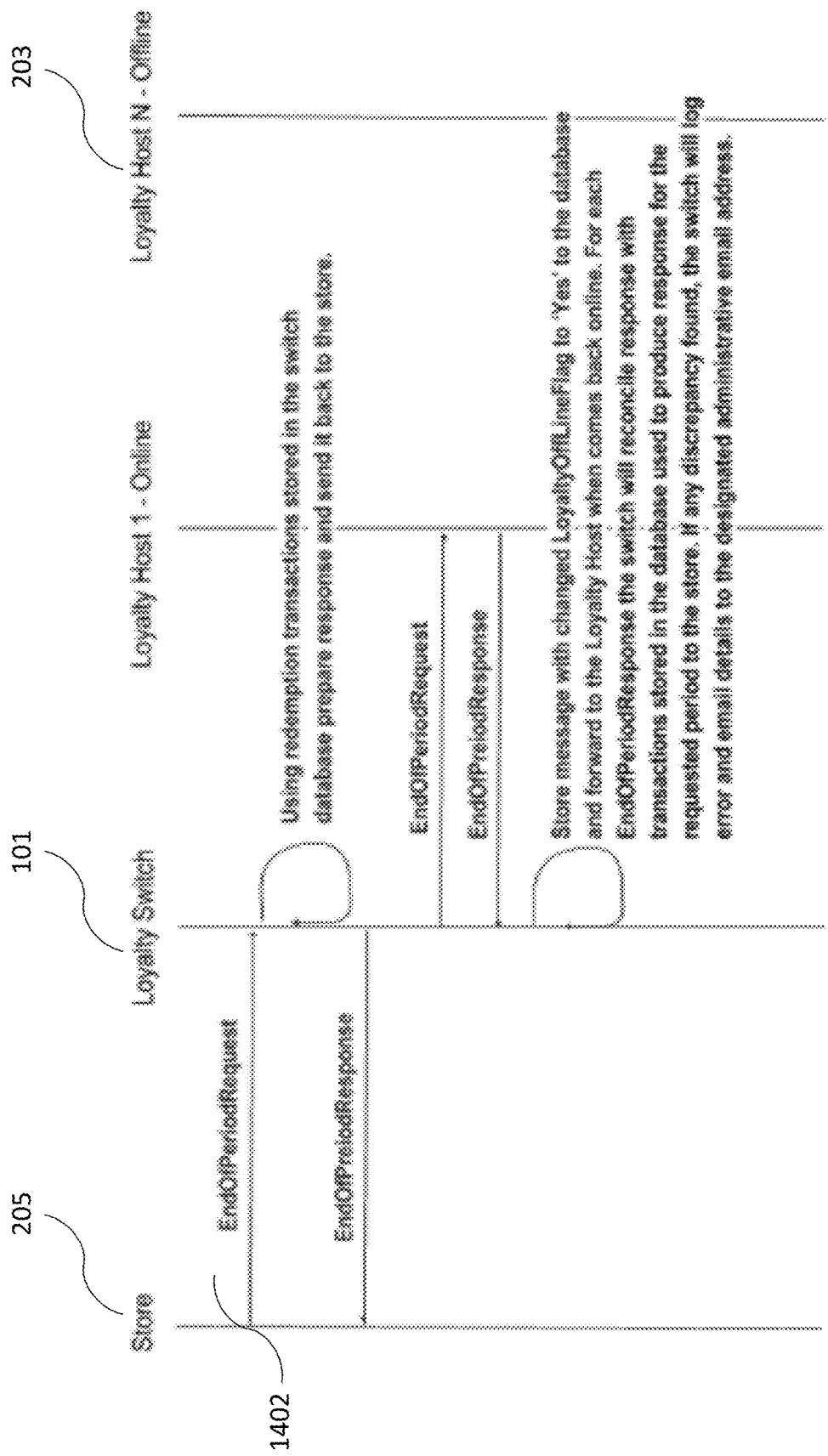
FIG. 14 shows a message flow diagram according to an exemplary embodiment.
Figure 15:
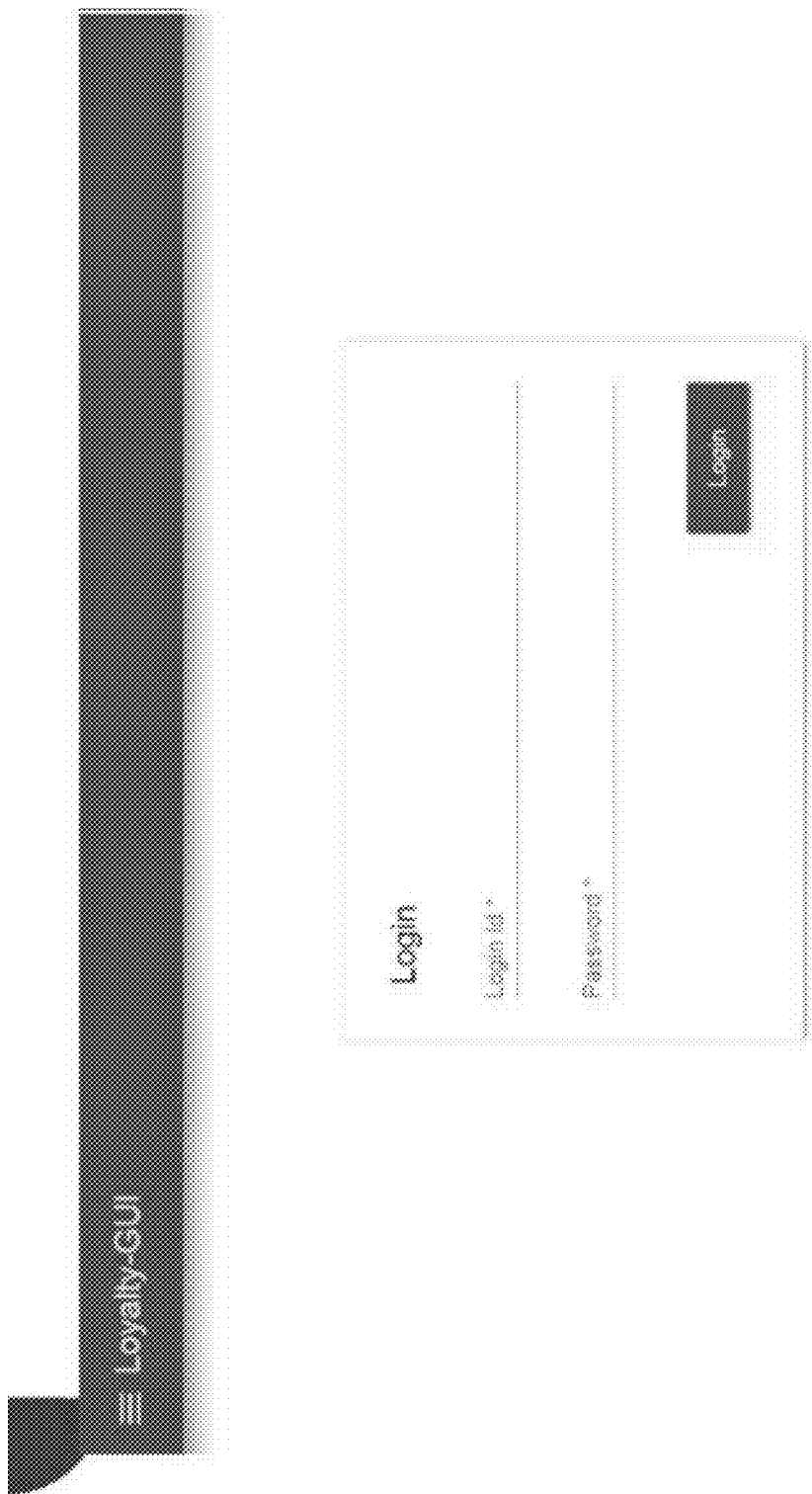
FIG. 15 shows the loyalty switch system's GUI (graphical user interface) according to an exemplary embodiment.

Turning now to FIGS. 7-14, message flow diagrams may be described. According to an exemplary embodiment, FIG. 7 may describe the message flows where the loyalty switch 101 receives initial GetLoyaltyOnlineStatusRequest (702) upon establishing connection (704) with the store 205 while one of loyalty hosts 203 is offline. FIG. 8 may describe the message flows where a loyalty switch 101 receives GetLoyaltyOnlineStatusRequest (802) while one of loyalty hosts 203 is offline. FIG. 9 may describe the message flows where a loyalty switch 101 receives GetRewardsRequest (902) for the purchase designated to an offline loyalty host 203. FIG. 10 may describe the message flows where a loyalty switch 101 receives GetCustomerMessagingRequest (1002) designated to loyalty host 203 that went offline during the purchase. FIG. 11 may describe the message flows where a loyalty switch 101 receives Request (1102) (FinalizeRewards, CancelTransaction, and/or ReverseTransaction) with LoyaltyOfflineFlag set to 'No' designated to an offline loyalty host 203. FIG. 12 may describe the message flows where a loyalty switch 101 receives Request (1202) (FinalizeRewards, CancelTransaction and/or ReverseTransaction) with LoyaltyOfflineFlag set to 'Yes' designated to an offline loyalty host 203. If the received message is FinalizeRewards or CancelTransaction without a loyalty sequence id, then routing rules may be applied on the message loyalty id to determine a correct loyalty host 203. If the result is more than one loyalty host 203, then host Sequencing Logic may be applied to find the correct loyalty host 203. FIG. 13 may describe the message flows where a loyalty switch 101 receives EndOfPeriodRequest (1302) while all loyalty hosts 203 that store 205 is connected to are online. FIG. 14 may describe the message flows where a loyalty switch 101 receives EndOfPeriodRequest (1402) while one or more loyalty hosts 203 are offline.

According to an exemplary embodiment, connections may be managed as follows. A listener 111 may stop accepting connections for a configurable period of time if the number of connections that are established from the stores 205 exceeds the critical number of connections (e.g., 5 to 7 times the number of stores 205). This timeout may allow switch 101 to purge unused/idle connections. If a newly established store 205 connection does not have a first message within a configurable time frame, then the store 205 connection may be closed and the store object 107 may be deleted. Within the same configurable time, the switch 101 on the store 205 level may try to reconnect with all offline loyalty hosts 203. If the connection is re-established, then GetLoyaltyOnlineStatusRequest, which is stored on store object 107 level, may be sent first. When GetLoyaltyOnlineStatusResponse is received, it may be ignored and offline flag may be set to false. This may allow the routing of incoming messages to the host 203. A next step may be for the switch 101 to start sending stored messages, one at a time. When a response is received for each sent message, the status may be updated in the database 109 as sent, and the same may be repeated for the next stored message until all are submitted to the host 203. While a stored messages queue is being processed, if any of the following messages is received: CancelTransactionRequest, FinalizeRewardsRequest, ReverseTransactionRequest and EndOfPeriodRequest, then the message may be stored in the database 109 at the end of the queue. For inactive loyalty host 203 connections on the store 205 level (i.e., no messages have been routed to for more than a configurable number of minutes/seconds on the host 203 level using admin GUI), the switch 101 may send GetLoyaltyOnlineStatusRequest message to prevent connection closing by the host 203. A response may be ignored.

According to an exemplary embodiment, Loyalty Hosts Sequencing may be described as follows. If logic, to determine designated loyalty host 203 for purchase/balance inquiry/any other offline message without loyalty sequence, results in more than one Program, then the switch 101 may use MultiProgramRouter component to select and designate a correct loyalty host 203 for the incoming message. MultiProgramRouter may consider loyalty hosts 203 associated with all applicable Programs and sort them by assigned priority. It may start sending the received purchase message to the loyalty host 203 with highest priority and if response is 'no rewards available or not recognized loyalty id', then it may continue through the list until rewards for the customer are found. If one of the loyalty hosts 203 is offline, then the host 203 may be skipped. If all applicable loyalty hosts 203 are down, then a failure response (GetRewardsResponse) as described above may be sent back to the store 205. If no rewards for the customer are found across all loyalty hosts 203, then the last program that recognized the loyalty id may be selected, but no reward may be provided to the customer. In a case where an offline message is received without a sequence id (e.g. finalize/cancel excluding EndofPeriodRequest) and if routing logic applied on the loyalty id results in more than one host 203, then MultiProgramRouter may be used to determine to which host 203 to submit the message. Offline hosts 203 may be skipped. MultiProgramRouter may stop, once a first successful response is received.

According to various exemplary embodiments, the present invention may include one or more tangible non-transitory computer-readable storage media embodying computer-readable instructions that are executable by an identity computing resource. In exemplary embodiments, the instructions may be to: receive a first message from the client computing resource by a loyalty switch to initiate a client connection, the loyalty switch having a client message queue, a selector handler pool manager, and one or more selector handlers; store the message within the client message queue; assign the client computing resource to an assigned selector handler from the one or more selected handlers by the selector handler pool manager; establish the client connection between the client computing resource and the assigned selector handler; receive a transaction message from the client computing resource over the client connection; determine a matching loyalty host computing resource from the at least one loyalty host computing resource by the assigned selector handler using selector routing logic; responsive to a determination that a host connection does not exist between the assigned selector handler and the matching loyalty host computing resource, establish the host connection; transmit the transaction message over the host connection to the matching loyalty host computing resource; transmit a client response message by the assigned selector handler over the client connection indicating a status indication in response to the transaction message, the status indication comprises a success indication and a failure indication; receive a host response message from the matching loyalty host computing resource containing the status indication; and responsive to a determination that the host connection does not exist and the matching loyalty host computing resource is offline, store the transaction message within the assigned selector handler for transmission once the host connection is established.

In some exemplary embodiments of the computer-readable storage media, the computer readable instructions may also include determining the matching loyalty host computing resource using selector routing logic. In exemplary embodiments, this may include: identifying a request type for the transaction message; responsive to the request type being 'forward all', storing the transaction message within a write buffer corresponding to all host connections associated with the at least one loyalty host computing resources supporting the client computing resource; responsive to the request type being 'reverse transaction', fetching a server ID associated with the reverse transaction and storing the transaction message within the write buffer corresponding to the server ID; responsive to the request type not being 'loyalty ID', fetching the server ID associated with a loyalty sequence ID of the transaction message and storing the transaction message within the write buffer corresponding to the server ID; responsive to the request type being 'loyalty ID' and the loyalty sequence ID being 'null', fetching the server ID associated with a loyalty sequence ID of the transaction message and storing the transaction message within the write buffer corresponding to the server ID; and responsive to the request type being 'loyalty ID' and the loyalty sequence ID not being 'null', performing the following: responsive to matching a pattern with the loyalty ID with all host connections associated with the at least one loyalty host computing resources, identifying the server ID of the matching pattern; and storing the transaction message within the write buffer corresponding to the server ID of the matching pattern.

In other exemplary embodiments of the computer-readable storage media, the computer-readable instructions for determining the matching loyalty host computing resource using selector routing logic may also include: responsive to unsuccessfully matching a pattern with the loyalty ID with all host connections associated with the at least one loyalty host computing resources, passing the transaction message to a multi-program matcher to the server ID of the at least one loyalty host computing resource to receive the transaction message; storing the transaction message within the write buffer corresponding to the server ID; and transmitting the write buffer to the loyalty host computing resource.

Turning now to FIGS. 15-26, a graphical user interface (GUI) of the loyalty switch system may be described.

According to an exemplary embodiment, the loyalty switch system may provide a graphical user interface (GUI) for configurations. In an exemplary embodiment, the switch GUI may have three different types of users based on their roles, which are described below. The "admin" may create/delete groups and users. Referring to FIGS. 17-20, the admin may also configure permissions for users of the following two roles: a "loyalty" and a "store". The loyalty user may add/remove programs (e.g. AAA) and loyalty host server info. The loyalty user may also set default loyalty server connection configuration for stores. The store user may add/edit/remove stores and their configuration, and also the store user may set group level default configurations. There may be multiple store groups as per the locality. According to an exemplary embodiment, specific roles may also be assigned to groups. Every group may be assigned a particular role (admin, loyalty and store), and all the users under a group may have access permissions as per the group's role. Also, in an exemplary embodiment, a user always may belong to a group. Whenever a user logs in, the user may access different modules as per their group's role.

Figure 16:
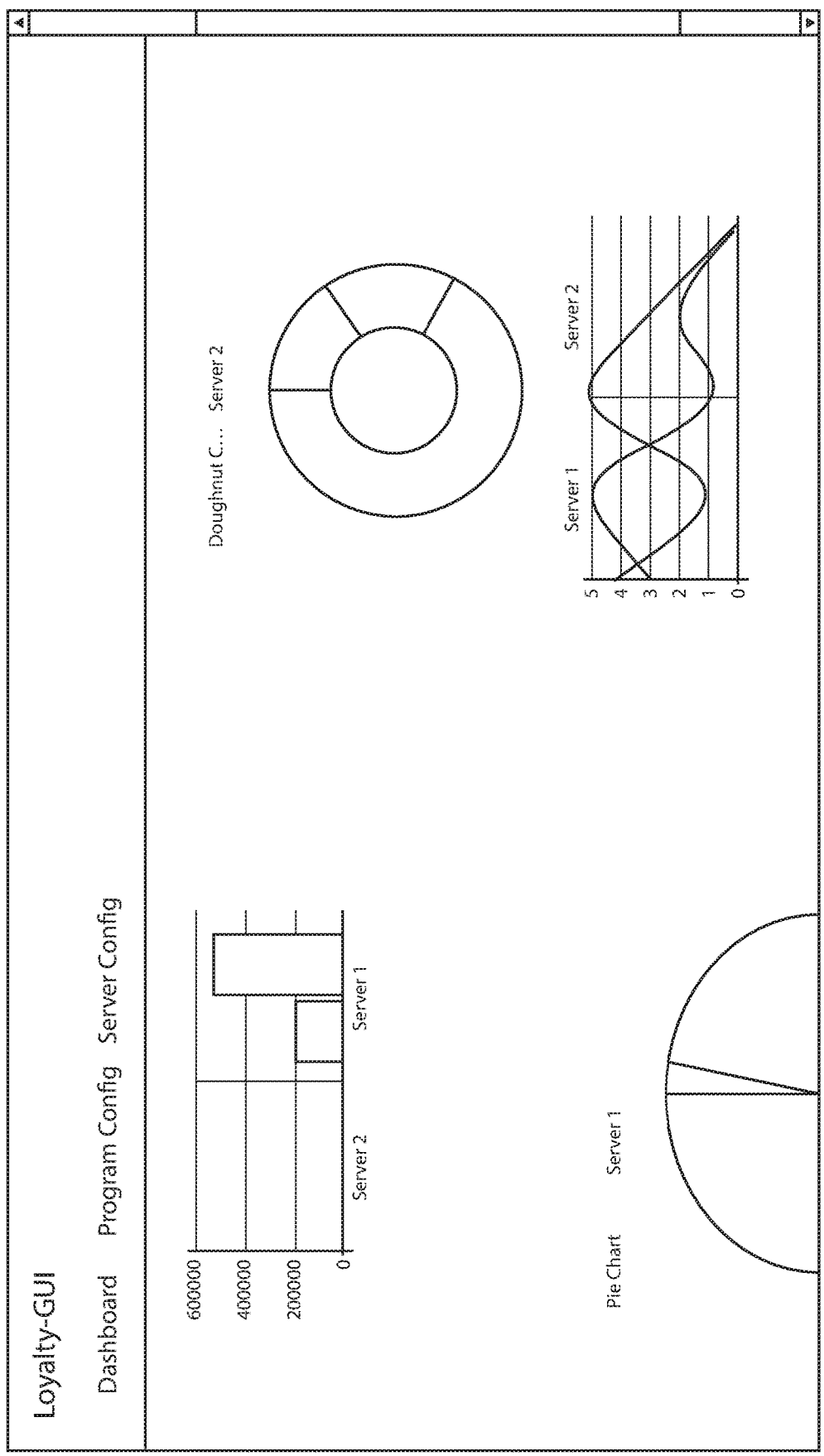
FIG. 16 shows the loyalty switch system's GUI according to an exemplary embodiment.
Figure 17:
FIG. 17 shows the loyalty switch system's GUI according to an exemplary embodiment.
Figure 18:
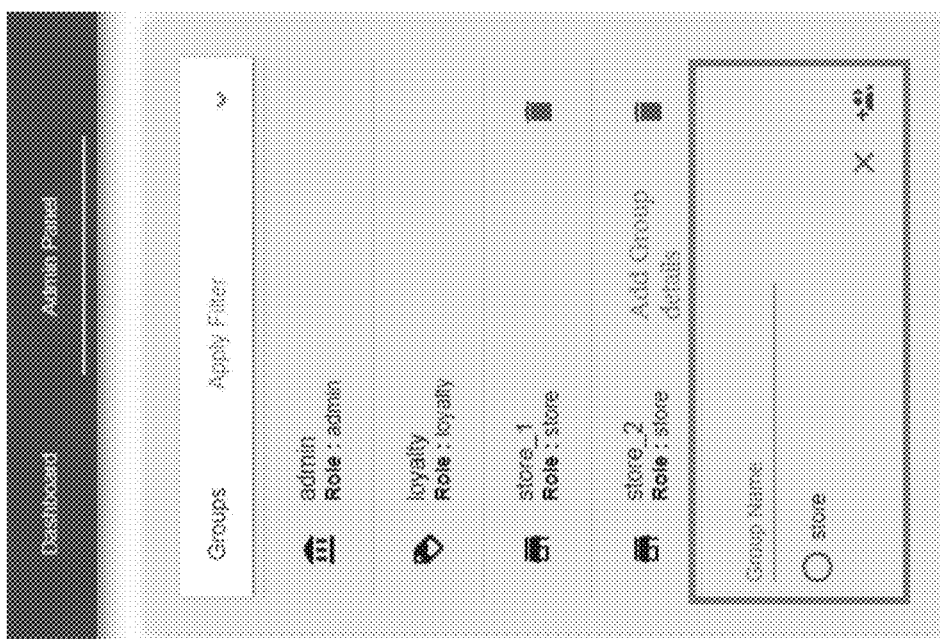
FIG. 18 shows the loyalty switch system's GUI according to an exemplary embodiment.
Figure 19:
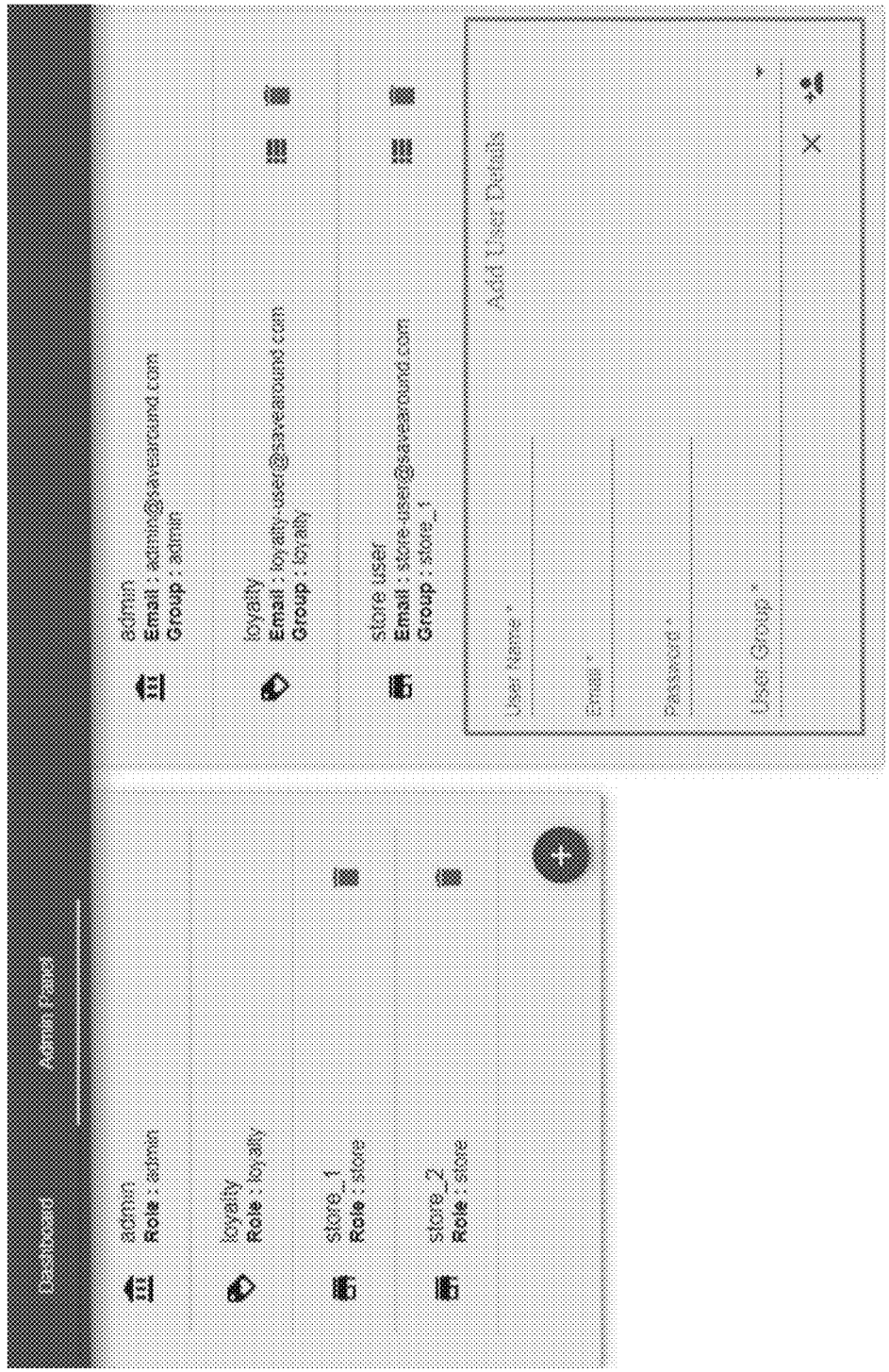
FIG. 19 shows the loyalty switch system's GUI according to an exemplary embodiment.
Figure 20:
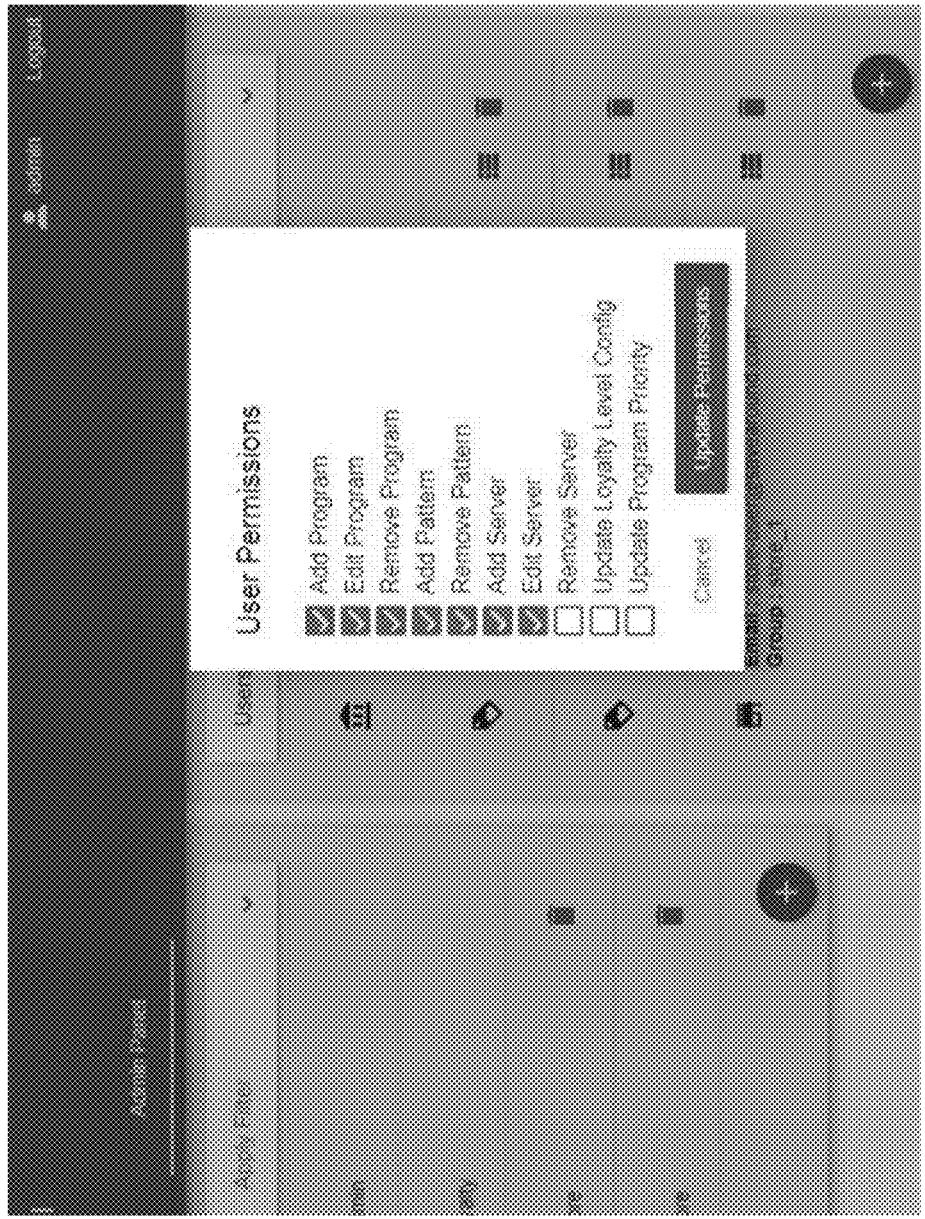
FIG. 20 shows the loyalty switch system's GUI according to an exemplary embodiment.

According to an exemplary embodiment, the loyalty switch system's GUI may provide a dashboard. The dashboard may contain charts to provide the statistical analysis of the system. Different roles may have access to different types of chart. (FIG. 16 may show charts for the loyalty role).

Figure 21:
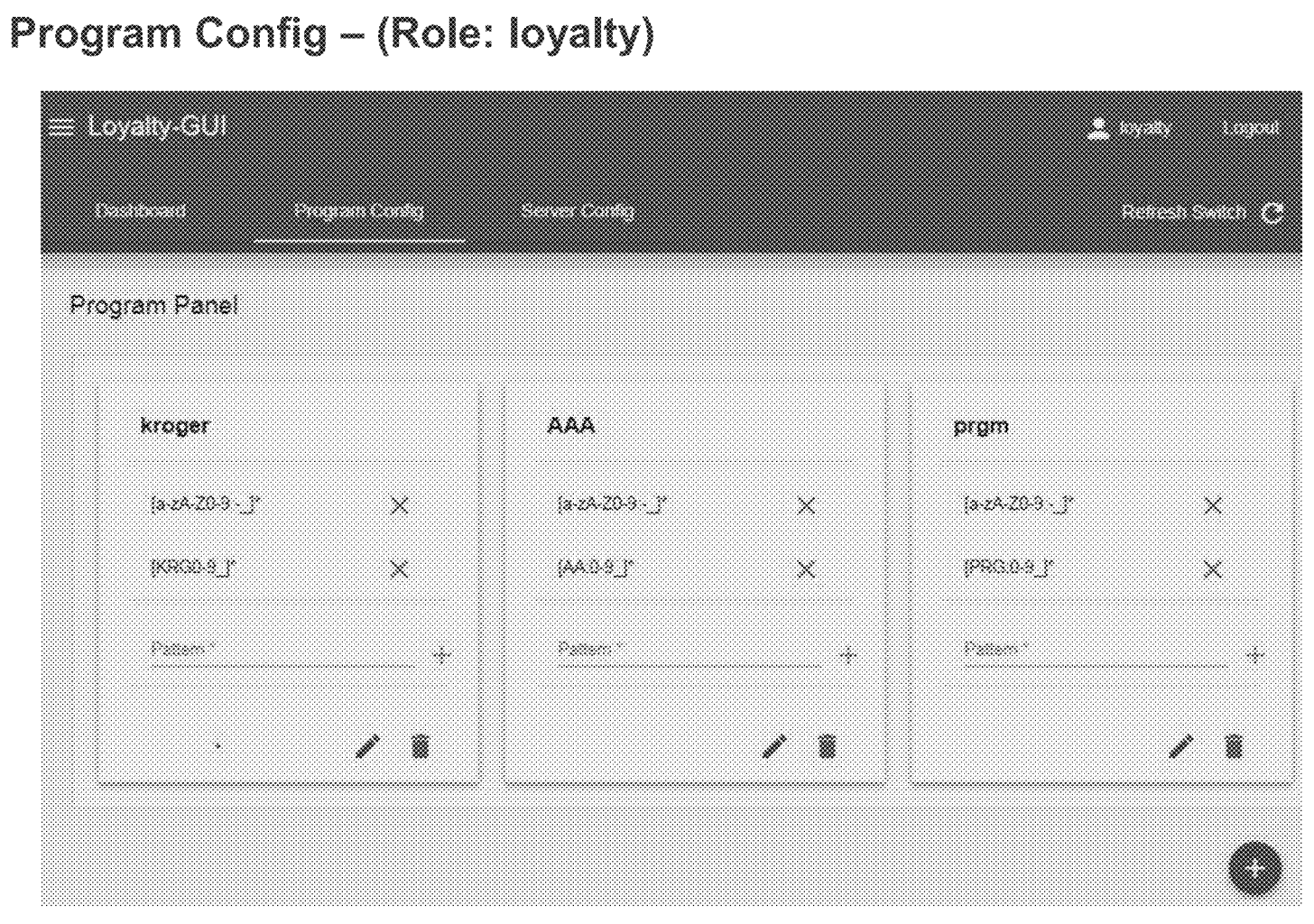
Figure 22:
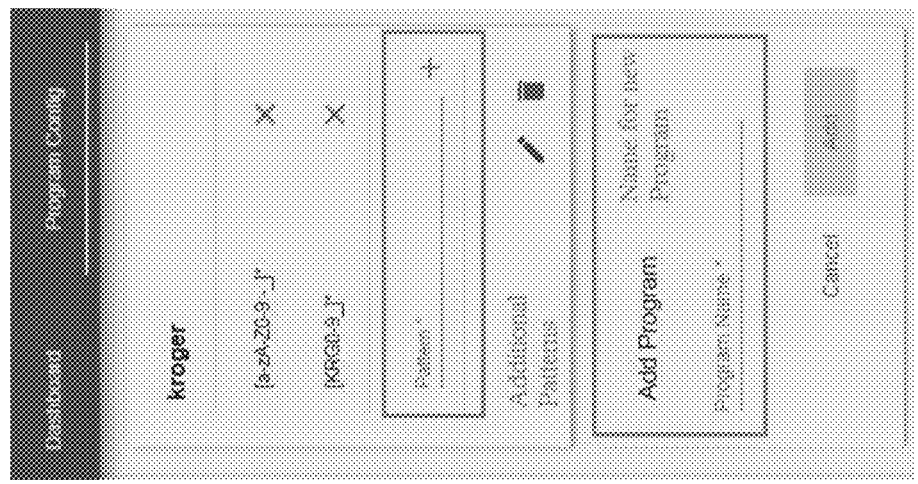
FIG. 22 shows the loyalty switch system's GUI according to an exemplary embodiment.

According to an exemplary embodiment, in the Program Config (role: loyalty) shown at FIGS. 21 and 22, new loyalty programs may be added to the loyalty host system through a GUI. Every program may be configured with a pattern that is matched with LoyaltyID to route messages by the loyalty switch.

Figure 23:
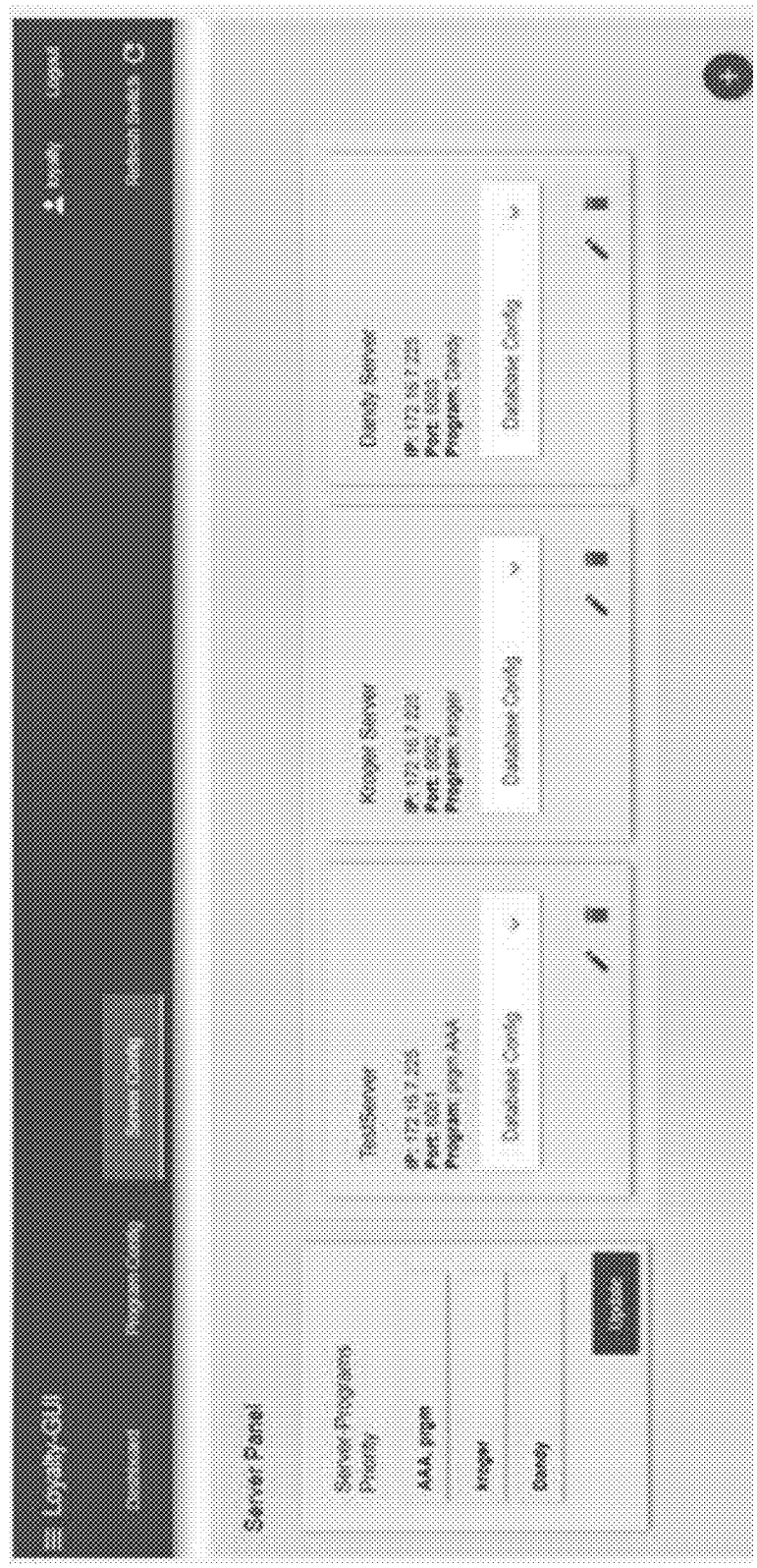
FIG. 23 shows the loyalty switch system's GUI according to an exemplary embodiment.
Figure 24:
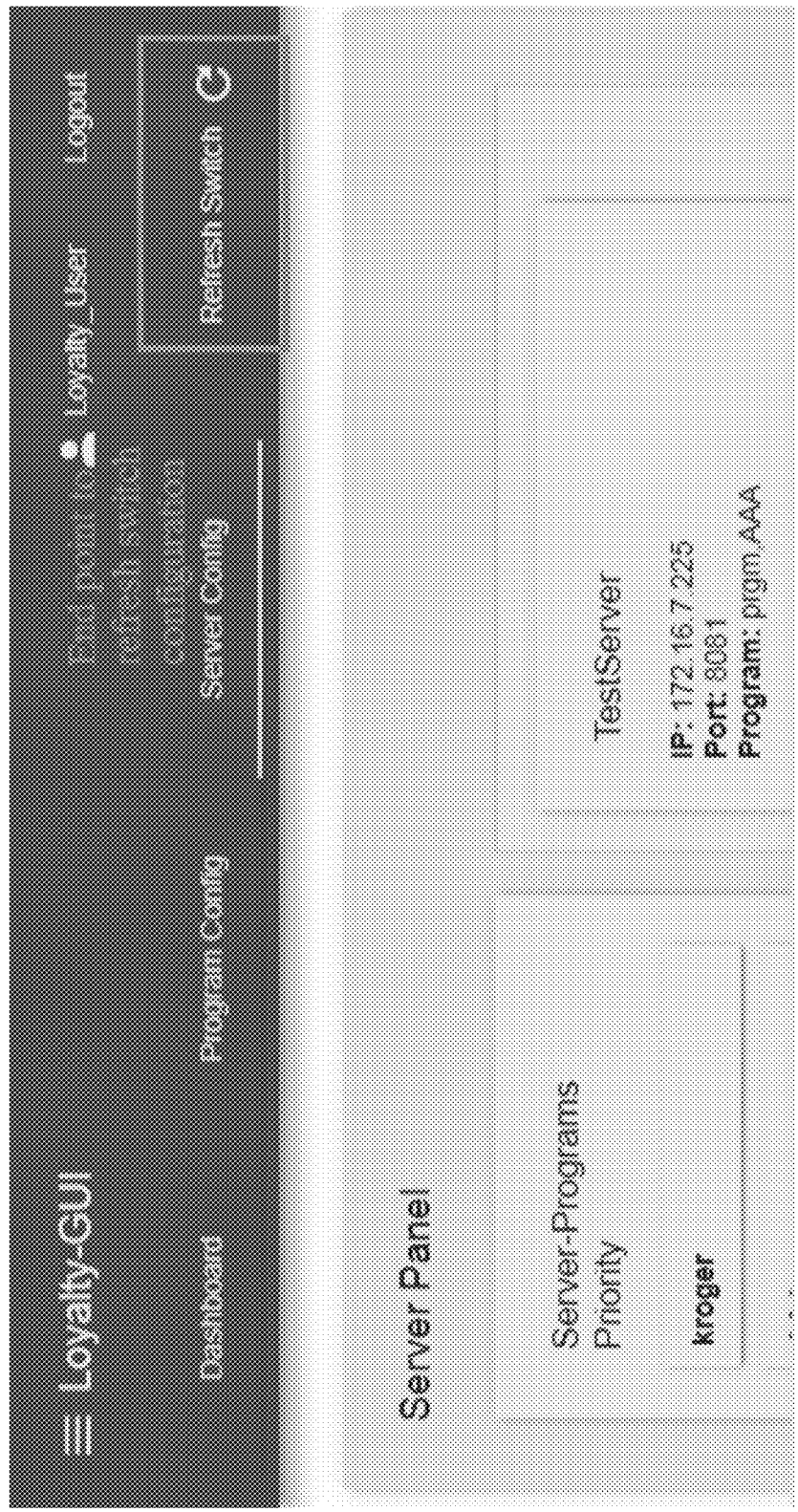
FIG. 24 shows the loyalty switch system's GUI according to an exemplary embodiment.

According to an exemplary embodiment, in the Loyalty Host Server Config (role: loyalty) shown at FIG. 23, whenever a server is added/removed from the loyalty host system, the server may be configured by the loyalty user through the GUI. The Loyalty Host Server may contain server IP, port, program and Database configuration (applicable to loyalty hosts managed by a service provider). From the switch perspective, every server may support only one program. If a loyalty host manages more than one program, i.e. Driver Rewards, Kroger and United, all three may be defined as single program in the switch configuration named, for example, "DR_Kroger_United". However, multiple servers may support the same program for increased scalability of the system. Priorities of servers may also be configured on this panel. Switch may use the provided priority for sequencing logic to route messages to more than one server if patterns for more than one program are matched. In that case, the program associated with the loyalty host with the highest priority may be chosen first. If no reward is available or loyalty id is not recognized, then the next program associated with the server with the second highest priority may be selected. Configuration on the switch for programs, patterns to match loyalty id, servers, priority of programs may be updated through endpoint available to the loyalty user on GUI.

Figure 25:
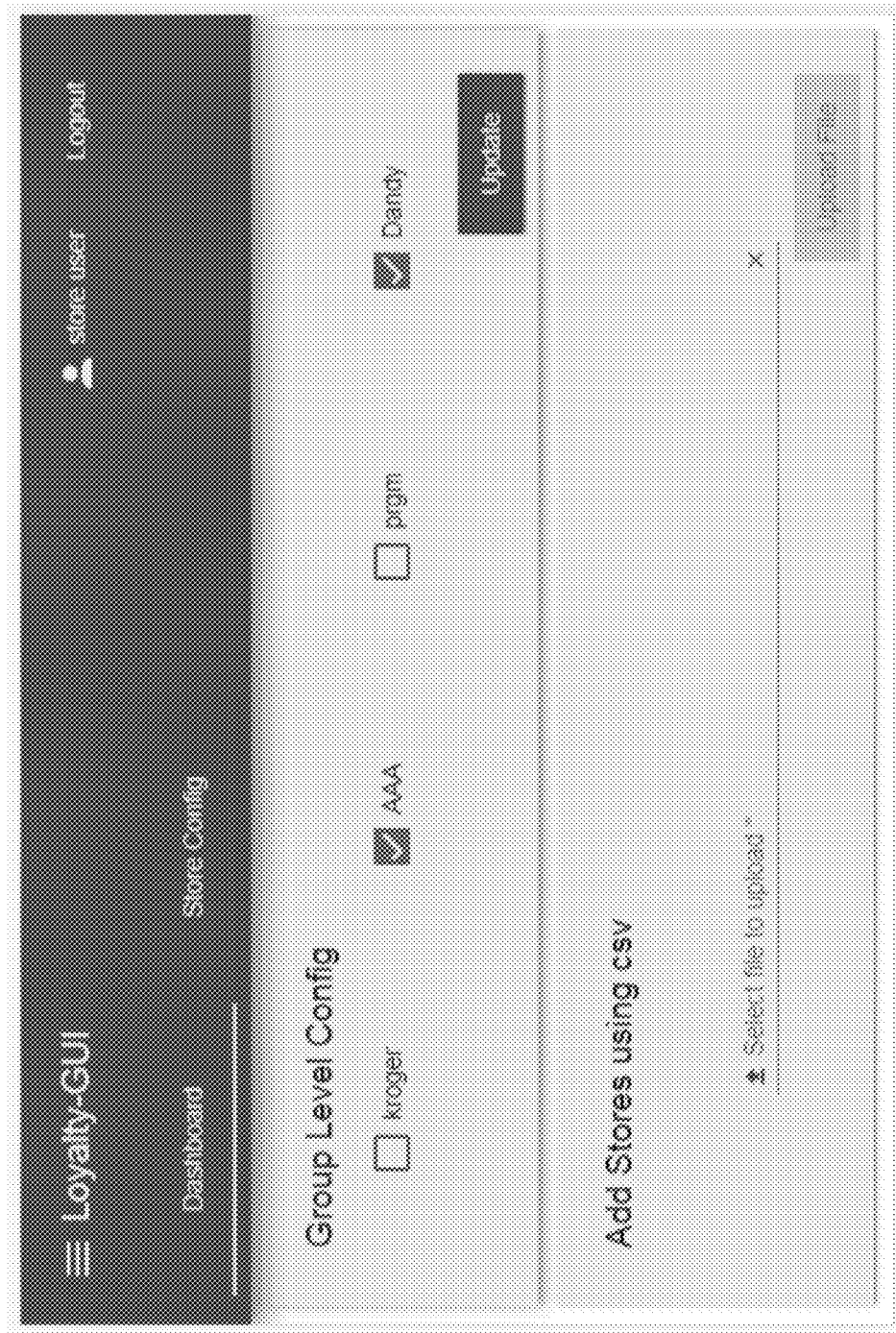
FIG. 25 shows the loyalty switch system's GUI according to an exemplary embodiment.

According to an exemplary embodiment, in the Store Config (Role: store) shown in FIG. 25, the stores may be added one by one using the GUI form or multiple stores may be added/updated in bulk by uploading, for example, xls or csv files. The detailed program for manually added stores may be configured through the GUI either one at a time for a range of stores, and a user may also have flexibility to provide program details for stores through file upload. Store configurations may specify what programs are supported by the stores, and the configuration information may be used by the switch in deciding what server needs to be connected and route messages through.

According to an exemplary embodiment, in the Store Loyalty Connection Config (not shown in drawings), it may be configured on different levels: "Store Level Config" may have the highest priority, if there are any configuration found at the store level, then it may be used to make connections to loyalty servers. If not, then it may fall back to a group level configuration; in "Store Group Level Config/(Default Store Loyalty Program Config) (Role: store)", when there is no store level configuration, then the switch may check for the store group level configuration that exists for the store and may use the store group level configuration to establish connections to specified loyal host servers, but if not available, then it may fall back to the default loyalty program configuration.

Figure 26:
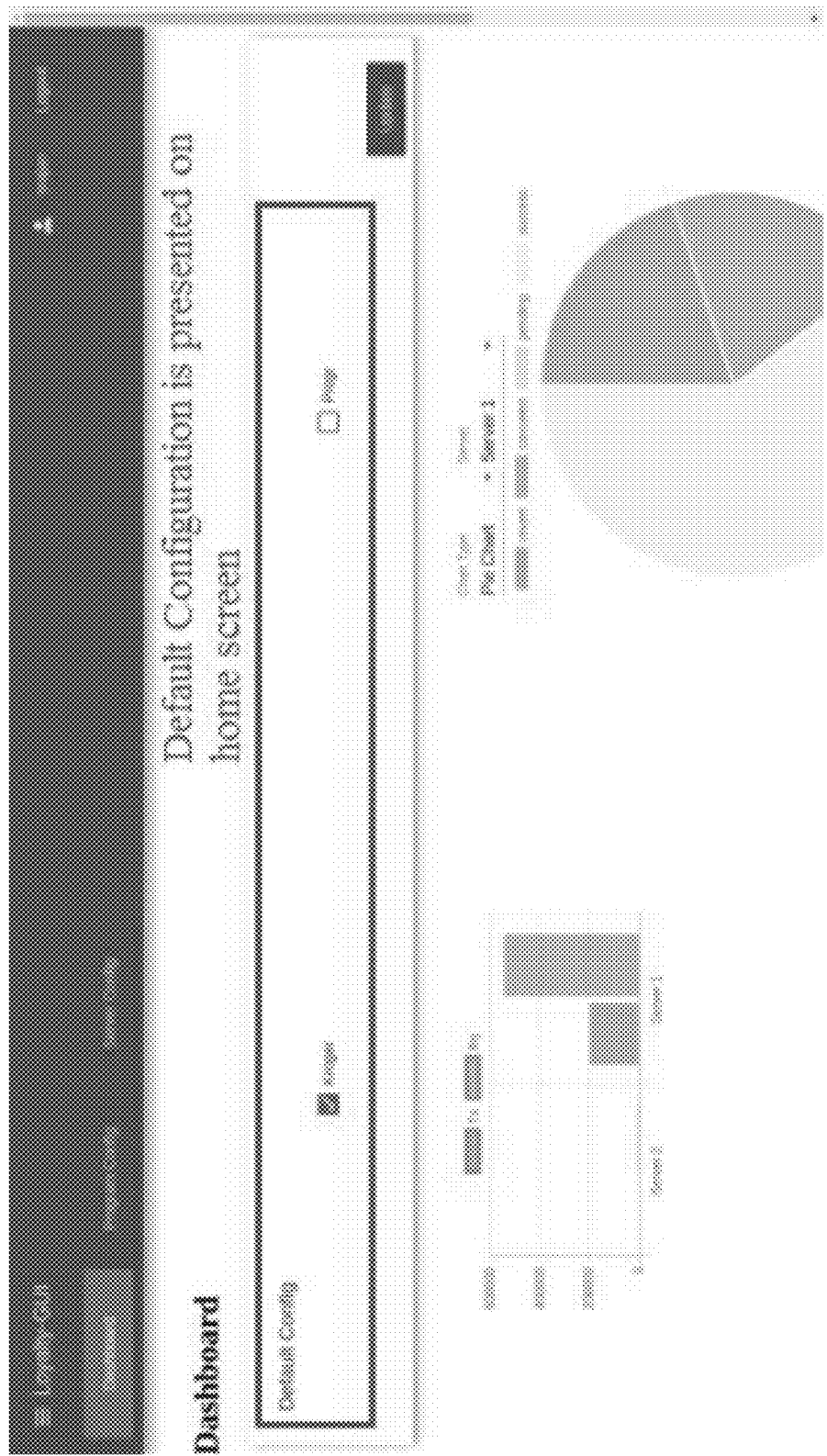
FIG. 26 shows the loyalty switch system's GUI according to an exemplary embodiment.

According to an exemplary embodiment, in the Default Store Loyalty Program Config (Role: loyalty) shown in FIG. 26, this configuration may be used for connections established from the stores that are not registered on the switch (either individually or via file upload). Also, such a configuration may be used if any store is registered, but there are no configurations both at the store and store group level.

According to various embodiments, the present invention includes a loyalty switch computing resource, i.e. a loyalty switch. In exemplary embodiments, the loyalty switch may be configured for routing a transaction message between one or more client computing resources and at least one loyalty host computing resource. In an exemplary embodiment, the loyalty switch may include: a client message queue for receiving a first message from the client computing resource by a loyalty switch to initiate a client connection, the loyalty switch having a client message queue, a selector handler pool manager, and one or more selector handlers; a selector handler pool manager for assigning the client computing resource to an assigned selector handler from the one or more selected handlers; and one or more selector handlers for determining a matching loyalty host computing resource from the at least one loyalty host computing resource by the assigned selector handler using selector routing logic and transmitting the transaction message over the host connection to the matching loyalty host computing resource.

In other exemplary embodiments of the loyalty switch, the one or more selector handlers may also: transmit a client response message by the assigned selector handler over the client connection indicating a status indication in response to the transaction message, the status indication including a success indication and a failure indication; receive a host response message from the matching loyalty host computing resource containing the status indication; and responsive to a determination that the host connection does not exist and the matching loyalty host computing resource is offline, store the transaction message within the assigned selector handler for transmission once the host connection is established.

In other exemplary embodiments of the loyalty switch, determining the matching loyalty host computing resource using selector routing logic may include: identifying a request type for the transaction message; responsive to the request type being 'forward all', storing the transaction message within a write buffer corresponding to all host connections associated with the at least one loyalty host computing resources supporting the client computing resource; responsive to the request type being 'reverse transaction', fetching a server ID associated with the reverse transaction and storing the transaction message within the write buffer corresponding to the server ID; responsive to the request type not being 'loyalty ID', fetching the server ID associated with a loyalty sequence ID of the transaction message and storing the transaction message within the write buffer corresponding to the server ID; responsive to the request type being 'loyalty ID' and the loyalty sequence ID being 'null', fetching the server ID associated with a loyalty sequence ID of the transaction message and storing the transaction message within the write buffer corresponding to the server ID; and responsive to the request type being 'loyalty ID' and the loyalty sequence ID not being 'null', performing the following: responsive to matching a pattern with the loyalty ID with all host connections associated with the at least one loyalty host computing resources, identifying the server ID of the matching pattern; and storing the transaction message within the write buffer corresponding to the server ID of the matching pattern.

In another exemplary embodiment of the loyalty switch, determining the matching loyalty host computing resource using selector routing logic may include: responsive to unsuccessfully matching a pattern with the loyalty ID with all host connections associated with the at least one loyalty host computing resources, passing the transaction message to a multi-program matcher to the server ID of the at least one loyalty host computing resource to receive the transaction message; storing the transaction message within the write buffer corresponding to the server ID; and transmitting the write buffer to the loyalty host computing resource.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A computer implemented method for connecting a client computing resource with at least one loyalty host computing resource, comprising:
   accepting a connection request from the client computing resource;
   passing a connection to one of a plurality of handlers selected using a round robin selection method;
   receiving one or more messages via the connection from the client computing resource by a loyalty switch;
   on every received message, after connections with one or more loyalty hosts are nonexistent for the client computing resource:
   using a plurality of loyalty switch configurable connection rules and information from the received message;
   establishing a connection to the one or more loyalty hosts for the accepted connection from the client computing resource;
   after a received message is a loyalty message comprising loyalty identification information from the client computing resource by the loyalty switch:
   according to a plurality of configurable routing rules, selecting a loyalty host from a plurality of loyalty hosts to which this message and all future messages associated with the same purchase should be routed, wherein the plurality of configurable routing rules determine the selected loyalty host based on sorting the plurality of loyalty hosts by an assigned priority;

receiving responses from the selected loyalty host;

routing the received responses to the client computing resource; and closing the connection with the client computing resource either upon determining that all host connections for the client computing resource do not exist or upon receiving an indication that the client computing resource is closing the connection.

2. The computer implemented method for connecting the client computing resource with the at least one loyalty host computing resource of claim 1, further comprising:

routing one or more received messages to all loyalty hosts the switch is connected to for the client computing resource, wherein the one or more received messages do not include a loyalty identification; and sending a response back to the client computing resource upon receiving responses from all loyalty hosts.

3. The computer implemented method for connecting the client computing resource with the at least one loyalty host computing resource of claim 1, further comprising:

storing the received message in a switch database.

4. The computer implemented method for connecting the client computing resource with the at least one loyalty host computing resource of claim 1, further comprising:

responsive to a determination that a loyalty host connection does not exist and/or the loyalty host is offline, storing a transaction message within a switch database for transmission once the loyalty host connection is reestablished.

5. The computer implemented method for connecting the client computing resource with the at least one loyalty host computing resource of claim 1, further comprising:

sending one or more keep-alive messages to one or more idle loyalty host connections; and storing a frequency of the keep-alive messages.

6. A computer-implemented system for a loyalty switch architecture embodied on a non-transitory computer-readable medium, comprising:

a loyalty switch;

a plurality of loyalty hosts connected to the loyalty switch;

a client computing resource configured to connect and send one or more loyalty messages to each loyalty host of the plurality of loyalty hosts;

a handler pool comprising a plurality of handlers, wherein the loyalty switch is configured to:

accept a connection from any number of client computing resources and pass the connection to one of the plurality of handlers using a round robin selection method;

receive one or more loyalty messages from the client computing resource;

after connections with the plurality of loyalty hosts are nonexistent for the client computing resource, connect to the plurality of loyalty hosts using a plurality of configurable connection rules and a content of the received loyalty message;

according to a plurality of configurable routing rules, select a loyalty host from the plurality of loyalty hosts to which this message and all future messages associated with the same purchase should be routed, wherein the plurality of configurable routing rules determine the selected loyalty host based on sorting the plurality of loyalty hosts by an assigned priority;

receive responses from the selected loyalty host, and routing the received responses to the client computing resource;

close the connection with the client computing resource either upon determining that all host connections for the client computing resource do not exist or upon receiving an indication that the client computing resource closed the connection.

7. The computer-implemented system for the loyalty switch architecture embodied on the non-transitory computer-readable medium of claim 6, further comprising:

a database comprising loyalty host information from the plurality of loyalty hosts, wherein the loyalty switch is configured to select only one loyalty host based on the loyalty host information and one or more client requests; wherein each handler connects to a plurality of store objects, each store object comprising a routing map, and a connection information from the plurality of loyalty hosts;

a switch database comprising a plurality of messages, wherein the loyalty switch identifies and stores a message type of each message in the switch database; and at least one point-of-sale device, wherein at least one of the plurality of the loyalty hosts is constantly connected to at least one point-of-sale device.

8. The computer implemented method of claim 1, wherein each loyalty switch is configured to appear as both a store and a loyalty host.

* * * * *